US012779397B2

(12) United States Patent
Matsuura et al.

(10) Patent No.: US 12,779,397 B2
(45) Date of Patent: Nov. 3, 2026

(54) METHOD AND APPARATUS FOR CLEANING EXHAUST GAS

(71) Applicant: NanoMist Technologies Co., Ltd., Tokushima (JP)

(72) Inventors: Kazuo Matsuura, Tokushima (JP); Toshiharu Chichibu, Tokyo (JP); Tomoyoshi Nomura, Tokyo (JP); Yuji Adachi, Tokyo (JP); Soichiro Shimada, Tokyo (JP); Shingo Tomemori, Tokyo (JP)

(73) Assignee: NANOMIST TECHNOLOGIES CO., LTD., Tokushima (JP)

( * ) Notice: Subject to any disclaimer, the term of this patent is extended or adjusted under 35 U.S.C. 154(b) by 787 days.

(21) Appl. No.: 18/015,633

(22) PCT Filed: Jul. 13, 2021

(86) PCT No.: PCT/JP2021/026217
§ 371 (c)(1),
(2) Date: Jan. 11, 2023

(87) PCT Pub. No.: WO2022/014553
PCT Pub. Date: Jan. 20, 2022

(65) Prior Publication Data

US 2023/0277984 A1 Sep. 7, 2023

(30) Foreign Application Priority Data

Jul. 13, 2020 (JP) ................................ 2020-120178

(51) Int. Cl.
*B01D 53/78* (2006.01)
*B01D 53/50* (2006.01)
(Continued)

(52) U.S. Cl.
CPC .......... *B01D 53/78* (2013.01); *B01D 53/504* (2013.01); *B01D 53/56* (2013.01); *B01D 53/75* (2013.01);
(Continued)

(58) Field of Classification Search
None
See application file for complete search history.

(56) References Cited

U.S. PATENT DOCUMENTS

2013/0156673 A1 6/2013 Nagayasu et al.
2014/0048467 A1 2/2014 Matsuura
(Continued)

FOREIGN PATENT DOCUMENTS

CN 1060039 A * 4/1992 ............ B01D 50/00
CN 2436804 Y * 6/2001 .............. F23J 15/00
(Continued)

OTHER PUBLICATIONS

International Search Report issued Sep. 7, 2021 in International Application No. PCT/JP2021/026217, with English translation.

*Primary Examiner* — Daniel Berns
(74) *Attorney, Agent, or Firm* — Wenderoth, Lind & Ponack, L.L.P.

(57) ABSTRACT

Atmospheric pollutants are efficiently separated from exhaust gas with low operating cost. The exhaust gas cleaning method forms a fine mist of aqueous alkaline solution with an atomizer in an atomizing step; mixes the aqueous alkaline solution mist with exhaust gas to absorb atmospheric pollutants contained in the exhaust gas into the mist in a mixing step; and separates mist that absorbed atmospheric pollutants from the exhaust gas in a separating step.

7 Claims, 10 Drawing Sheets

(51) Int. Cl.
*B01D 53/56* (2006.01)
*B01D 53/75* (2006.01)
*B01D 53/76* (2006.01)

(52) U.S. Cl.
CPC ........ *B01D 53/76* (2013.01); *B01D 2251/102* (2013.01); *B01D 2251/304* (2013.01); *B01D 2251/306* (2013.01); *B01D 2251/604* (2013.01); *B01D 2257/302* (2013.01); *B01D 2257/404* (2013.01); *B01D 2258/0283* (2013.01)

(56) References Cited

U.S. PATENT DOCUMENTS

| | | | | |
|---|---|---|---|---|
| 2016/0059185 A1 | 3/2016 | Naito | | |
| 2019/0160395 A1* | 5/2019 | Saini | .................... | B01D 17/045 |

FOREIGN PATENT DOCUMENTS

| | | |
|---|---|---|
| JP | 60-153922 | 8/1985 |
| JP | 2000-262853 | 9/2000 |
| JP | 2007-118005 | 5/2007 |
| JP | 2013-32777 | 2/2013 |
| JP | 2021-23900 | 2/2021 |
| WO | 2011/152551 | 12/2011 |
| WO | 2012/105654 | 8/2012 |
| WO | 2015/041102 | 3/2015 |

* cited by examiner

METHOD AND APPARATUS FOR CLEANING EXHAUST GAS

CROSS-REFERENCE TO RELATED APPLICATIONS

The present application is a national phase application of PCT Application No. PCT/JP2022/014553, filed on Jul. 13, 2021, and claims priority under 35 U. S. C. § 119 to Japanese Patent Application No. 2020-120178, filed on Jul. 13, 2020, the contents of which are incorporated herein by references in their entirety.

BACKGROUND

The present invention relates to a method and apparatus that separates atmospheric pollutants contained in exhaust gas to clean the exhaust gas. Note in this patent application, "atmospheric pollutants" implies either or both $SO_x$ and $NO_x$.

Exhaust gas, which is discharged from power plants and industrial facilities that use fossil fuels, contains $SO_x$ and $NO_x$ atmospheric pollutants. In addition to having detrimental effects on the human body that include bronchial inflammation and asthma, $SO_x$ atmospheric pollutants also cause of acid rain. $NO_x$ atmospheric pollutants detrimentally affect respiratory organs such as the throat and lungs. A method of separating $NO_x$ atmospheric pollutants from exhaust gas has been developed (JP2013-32777A, e.g.).

To remove $NO_x$ from diesel engine exhaust gas, the exhaust gas purifying apparatus cited in JP2013-32777A disclosure is provided with a reducing agent supply section that supplies reducing agent for reduction of exhaust gas $NO_x$, and an $NO_x$ detection system that detects $NO_x$ concentration in the exhaust gas. The amount of reducing agent supplied from the reducing agent supply section is regulated based on $NO_x$ detection system information to remove $NO_x$ from exhaust gas. Aqueous urea solution is used as the reducing agent.

In a large scale cleaning apparatus that supplies aqueous urea solution to exhaust gas to remove $NO_x$, it is difficult to efficiently remove $NO_x$ while maintaining low operating cost.

The present invention was developed with the object of eliminating this drawback. Thus one object of the present invention is to provide a method and apparatus for cleaning exhaust gas that reduces operating cost and efficiently removes atmospheric pollutants to clean exhaust gas.

SUMMARY

An implementation of the method for cleaning exhaust gas of the present invention is a method that separates atmospheric pollutants to clean the exhaust gas and includes an atomizing step that forms an aqueous alkaline solution mist with an atomizer; a mixing step that mixes the aqueous alkaline solution mist with exhaust gas to absorb atmospheric pollutants contained in the exhaust gas into the mist; and a separating step that separates the mist, which absorbed atmospheric pollutants in the mixing step, from the exhaust gas.

An implementation of the apparatus for cleaning exhaust gas of the present invention is an apparatus that separates atmospheric pollutants to clean the exhaust gas and is provided with an atomizer that atomizes aqueous alkaline solution to form mist; a mixer that mixes the mist generated by the atomizer with exhaust gas to absorb atmospheric pollutants contained in the exhaust gas into the mist; and a separator that separates the mist, which absorbed atmospheric pollutants in the mixer, from the exhaust gas.

By absorbing and separating atmospheric pollutants with fine mist, the method and apparatus for cleaning exhaust gas described above can efficiently separate atmospheric pollutants from exhaust gas with reduced operating cost.

DESCRIPTION

Figure 1:
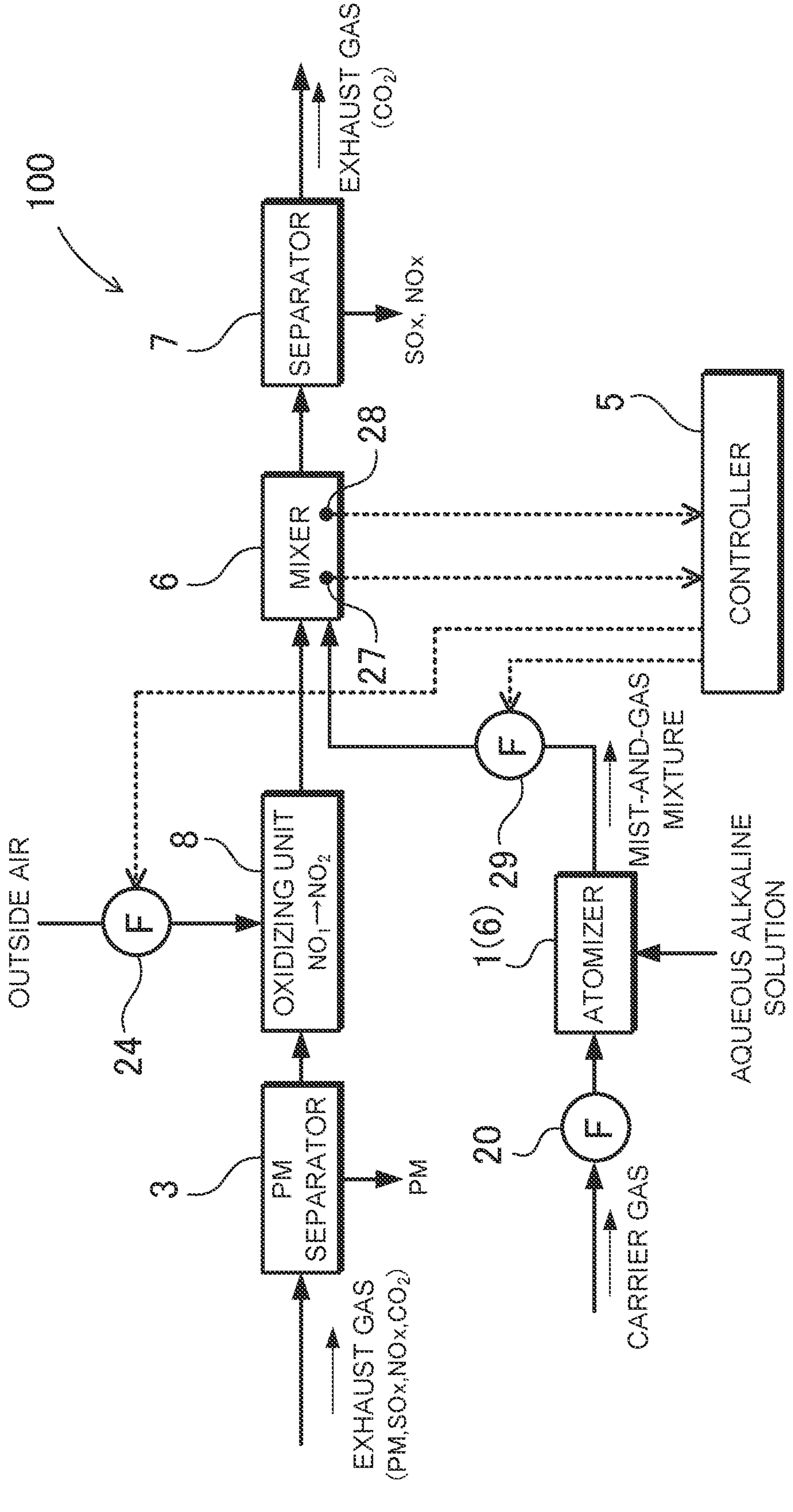
FIG. 1 is a block diagram of the exhaust gas cleaning apparatus for the first embodiment of the present invention.

The following describes the present invention in detail based on the figures. Although terms indicating specific direction and/or position (e.g. above, below, and terminology that includes those types of words) are used as required In the following descriptions, use of those terms is for the purpose of making the invention easy to understand with reference to the figures and the technical scope of the present invention is not limited based on the meaning of those terms. Further, components that appear in a plurality of figures with the same reference number (sign) indicate components or materials that are the same or equivalent. The following implementations and embodiments are merely specific examples of the technology associated with the invention, and the present invention is not limited to the implementations and embodiments described below. In the absence of specific annotation, structural component features described in the following such as dimensions, raw material, shape, and relative position are simply for the purpose of explicative example and are not intended to limit the scope of the invention. Descriptive contents relating to one implementation or embodiment may also be applied to describe other implementations or embodiments. Further, properties such as the size and spatial relation of components shown in the figures may be exaggerated for the purpose of clear explanation.

The $1^{st}$ aspect of the method for cleaning exhaust gas of the present invention is a method that separates atmospheric pollutants to clean the exhaust gas and includes an atomizing step that forms an aqueous alkaline solution mist with an atomizer; a mixing step that mixes the aqueous alkaline solution mist with exhaust gas to absorb atmospheric pollutants contained in the exhaust gas into the mist; and a separating step that separates the mist, which absorbed atmospheric pollutants in the mixing step, from the exhaust gas.

In the 2$^{nd}$ aspect of the method for cleaning exhaust gas of the present invention, the atomizer ultrasonically vibrates the aqueous alkaline solution to form mist in the atomizing step.

In the 3$^{rd}$ aspect of the method for cleaning exhaust gas of the present invention, the atomizer ultrasonically vibrates the aqueous alkaline solution in the atomizing step to form a column of liquid that protrudes from the liquid surface, and blows exhaust gas over the surface of the liquid column to mix the mist and exhaust gas.

In the 4$^{th}$ aspect of the method for cleaning exhaust gas of the present invention, the atomizer ultrasonically vibrates the aqueous alkaline solution in the atomizing step to form a column of liquid that protrudes from the liquid surface, blows a carrier gas over the surface of the liquid column to form a mist of mixed gas, and mixes that mixed gas mist with exhaust gas in the mixing step.

In the 5$^{th}$ aspect of the method for cleaning exhaust gas of the present invention, the atomizer ejects aqueous alkaline solution spray from a nozzle and atomizes that spray via static electricity to form mist in the atomizing step.

In the 6$^{th}$ aspect of the method for cleaning exhaust gas of the present invention, the atomizer blows exhaust gas into the static electricity atomized nozzle spray mist to mix the mist and exhaust gas in the atomizing step.

In the 7$^{th}$ aspect of the method for cleaning exhaust gas of the present invention, the atomizer blows a carrier gas into the static electricity atomized nozzle spray mist to form a mist-and-gas mixture, and mixes that mist-and-gas mixture with exhaust gas in the mixing step.

In the 8$^{th}$ aspect of the method for cleaning exhaust gas of the present invention, the average diameter of the aqueous alkaline solution mist in the atomizing step is less than or equal to 50 μm. Further, in the 9$^{th}$ aspect of the method for cleaning exhaust gas of the present invention, the average diameter of the aqueous alkaline solution mist in the atomizing step is less than or equal to 30 μm.

In the 10$^{th}$ aspect of the method for cleaning exhaust gas of the present invention, the average diameter of the aqueous alkaline solution mist in the atomizing step is greater than or equal to 100 nm.

In the 11$^{th}$ aspect of the method for cleaning exhaust gas of the present invention, the mixing step includes a first mixing step and a second mixing step; exhaust gas $SO_x$ is absorbed into the mist in the first mixing step, and subsequently exhaust gas $NO_x$ is absorbed into the mist in the second mixing step.

The 12$^{th}$ aspect of the method for cleaning exhaust gas of the present invention includes an oxidizing step that supplies an oxygen containing gas to the exhaust gas, and oxidized $NO_2$ is absorbed into the mist.

In the 13$^{th}$ aspect of the method for cleaning exhaust gas of the present invention, mist that absorbed atmospheric pollutants is separated from exhaust gas by a cyclone separator in the separating step.

In the 14$^{th}$ aspect of the method for cleaning exhaust gas of the present invention, aqueous alkaline solution mist is mixed with exhaust gas using a static mixer in the mixing step.

In the 15$^{th}$ aspect of the method for cleaning exhaust gas of the present invention, aqueous alkaline solution mist is mixed with exhaust gas with a mixer in the mixing step, and temperature in the mixer is maintained at or below the dew point.

In the 16$^{th}$ aspect of the method for cleaning exhaust gas of the present invention, temperature or flow rate of exhaust gas supplied to the mixer is regulated to keep temperature in the mixer at or below the dew point.

In the 17$^{th}$ aspect of the method for cleaning exhaust gas of the present invention, alkaline metal aqueous alkaline solution is used as the aqueous alkaline solution in the atomizing step.

The 18$^{th}$ aspect of the method for cleaning exhaust gas of the present invention includes a particulate matter (PM) separating step that removes fine particles from the exhaust gas, and atmospheric pollutants are separated from exhaust gas, which has particulate matter removed in the PM separating step.

The 19$^{th}$ aspect of the apparatus for cleaning exhaust gas of the present invention is an apparatus that separates atmospheric pollutants to clean the exhaust gas and is provided with an atomizer that atomizes aqueous alkaline solution to form mist; a mixer that mixes mist generated by the atomizer with exhaust gas to absorb atmospheric pollutants contained in the exhaust gas into the mist; and a separator that separates the mist, which absorbed atmospheric pollutants in the mixer, from the exhaust gas.

In the 20$^{th}$ aspect of the apparatus for cleaning exhaust gas of the present invention, the atomizer is an ultrasonic atomizer that ultrasonically vibrates the aqueous alkaline solution to form mist.

The 21$^{st}$ aspect of the apparatus for cleaning exhaust gas of the present invention is provided with a blower mechanism, wherein the ultrasonic atomizer vibrates the aqueous alkaline solution to establish a liquid column that protrudes from the surface of the aqueous alkaline solution, and the blower mechanism blows exhaust gas over the liquid column to mix mist and exhaust gas.

The 22$^{nd}$ aspect of the apparatus for cleaning exhaust gas of the present invention is provided with a blower mechanism, wherein the ultrasonic atomizer vibrates the aqueous alkaline solution to establish a liquid column that protrudes from the surface of the aqueous alkaline solution, the blower mechanism blows a carrier gas over the surface of the liquid column to form a mist-and-gas mixture, and the mixer mixes that mist-gas mixture with exhaust gas.

In the 23$^{rd}$ aspect of the apparatus for cleaning exhaust gas of the present invention, the atomizer is a static electricity atomizer that electro-statically atomizes aqueous alkaline solution sprayed from nozzles to form mist.

The 24$^{th}$ aspect of the apparatus for cleaning exhaust gas of the present invention is provided with a blower mechanism that blows exhaust gas into the mist electro-statically atomized by the static electricity atomizer to mix exhaust gas with the mist.

The 25$^{th}$ aspect of the apparatus for cleaning exhaust gas of the present invention is provided with a blower mechanism that blows a carrier gas into the mist electro-statically atomized by the static electricity atomizer to form a mist-and-gas mixture, and the mixer mixes that mist-gas mixture with exhaust gas.

In the 26$^{th}$ aspect of the apparatus for cleaning exhaust gas of the present invention, the atomizer produces aqueous alkaline solution mist with an average diameter less than or equal to 50 μm. Further, in the 27$^{th}$ aspect of the apparatus for cleaning exhaust gas of the present invention, the atomizer produces aqueous alkaline solution mist with an average diameter less than or equal to 30 μm.

In the 28th aspect of the apparatus for cleaning exhaust gas of the present invention, the atomizer produces aqueous alkaline solution mist with an average diameter greater than or equal to 100 nm.

In the 29th aspect of the apparatus for cleaning exhaust gas of the present invention, the mixer is provided with a first mixer and a second mixer that are connected together in series. Further, in the 30th aspect of the apparatus for cleaning exhaust gas of the present invention, the second mixer is connected to the outlet side of the first mixer.

The 31st aspect of the apparatus for cleaning exhaust gas of the present invention is provided with an oxidizing unit that supplies an oxygen containing gas to the exhaust gas to oxidize $NO_1$ atmospheric pollutant and form $NO_2$, and the mixer mixes $NO_2$ oxidized in the oxidizing unit with mist.

In the 32nd aspect of the apparatus for cleaning exhaust gas of the present invention, the separator is a cyclone separator.

In the 33rd aspect of the apparatus for cleaning exhaust gas of the present invention, the mixer is a static mixer.

In the 34th aspect of the apparatus for cleaning exhaust gas of the present invention, the mixer mixes exhaust gas and mist while maintaining temperature inside the mixer at or below the dew point.

In the 35th aspect of the apparatus for cleaning exhaust gas of the present invention, temperature or flow rate of exhaust gas supplied to the mixer is regulated to keep temperature inside the mixer at or below the dew point.

In the 36th aspect of the apparatus for cleaning exhaust gas of the present invention, the atomizer forms mist from alkaline metal aqueous alkaline solution.

The 37th aspect of the apparatus for cleaning exhaust gas of the present invention is provided with a PM separator that removes exhaust gas particulate matter, and the mixer mixes mist with exhaust gas, which has particulate matter removed by the PM separator.

First Embodiment

FIG. 1 is a block diagram showing a cleaning apparatus for separating atmospheric pollutants from exhaust gas discharged from a power plant or industrial facility using fossil fuels. Exhaust gas contains $SO_x$ and $NO_x$ as atmospheric pollutants. $NO_x$ is made up of $NO_1$ and $NO_2$. Since $NO_2$ and $SO_x$ are readily soluble in water (i.e. aqueous solution), they dissolve in aqueous alkaline solution mist and can be removed. Since $NO_1$ is not very soluble in water, it is oxidized in an oxidizing unit to form $NO_2$, which readily goes into solution and can be removed. Note, exhaust gas further includes particulate matter (PM).

The cleaning apparatus 100 shown in the block diagram of FIG. 1 separates $SO_x$ and $NO_x$, which are atmospheric pollutants included in exhaust gas. The cleaning apparatus 100 in this figure is provided with an atomizer 1 that atomizes aqueous alkaline solution to form mist; a mixer 6 that mixes mist generated by the atomizer 1 with exhaust gas to absorb atmospheric pollutants contained in the exhaust gas into the mist; and a separator 7 that separates the mist, which absorbed atmospheric pollutants in the mixer 6, from the exhaust gas. In addition, the cleaning apparatus 100 in the figure is also provided with an oxidizing unit 8 that converts not very water soluble $NO_1$ to readily soluble $NO_2$, a PM separator 3 that separates particulate matter included in the exhaust gas, and a controller 5 that controls the atomizer 1. The cleaning apparatus 100 in this figure separates $SO_x$ and $NO_x$ atmospheric pollutants from exhaust gas, which has been treated in the PM separator 3 to remove particulate matter.

Atomizer 1

Figure 2:
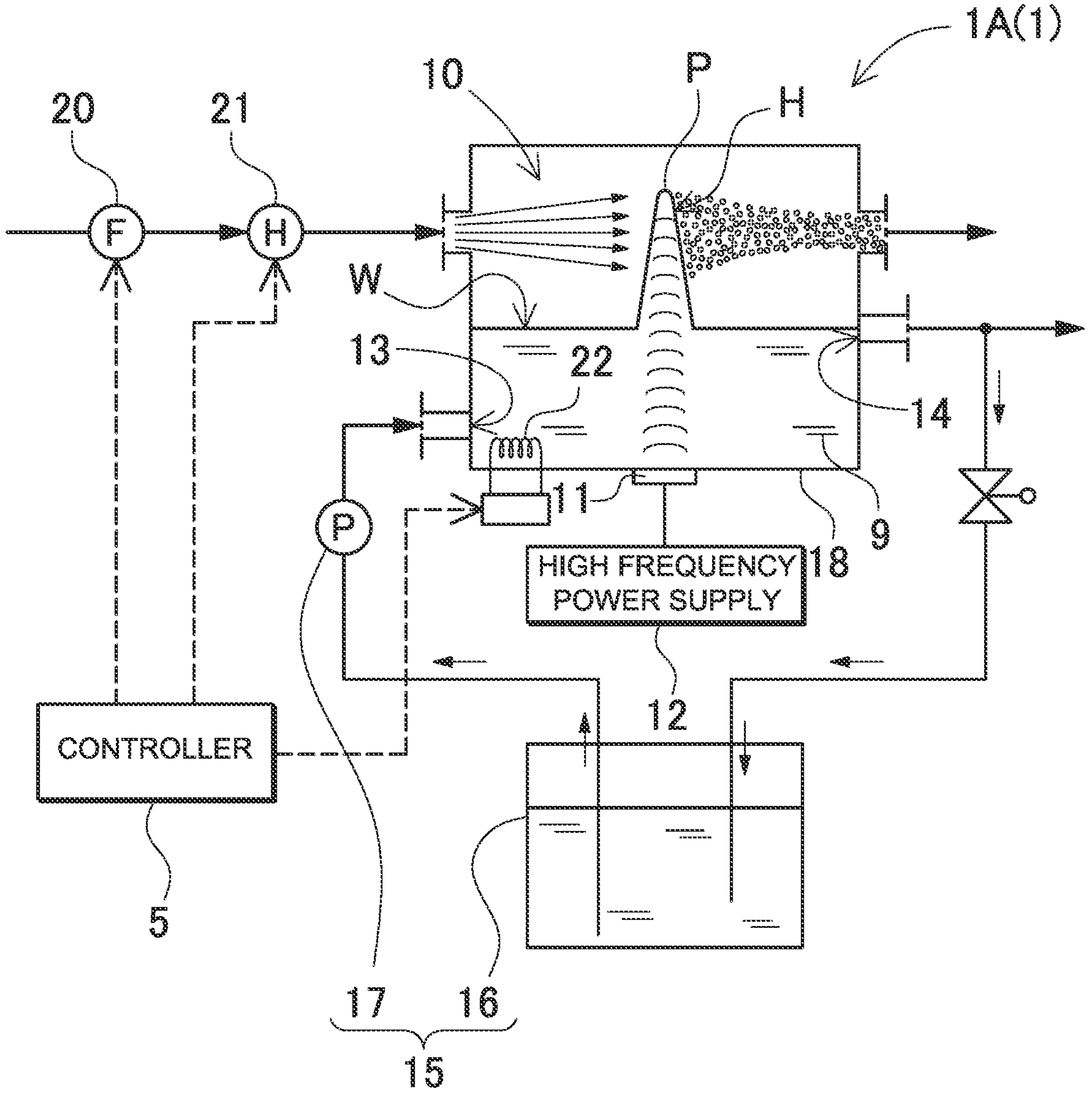
FIG. 2 is a schematic diagram showing an ultrasonic atomizer, which is one example of an atomizer.

The atomizer 1 converts the aqueous alkaline solution to a mist. The aqueous alkaline solution mist is formed as a fine mist with small particle diameter, and mist particle surface area can be made large with respect to unit particle weight. Fine mist particles with large surface area have a large area of contact with the exhaust gas, and atmospheric pollutants included in the exhaust gas are rapidly absorbed in the mist. FIG. 2 is a schematic drawing of the atomizer 1. The atomizer 1 in FIG. 2 ultrasonically vibrates the aqueous alkaline solution to generate a fine mist of aqueous alkaline solution. The atomizer 1 in FIG. 2 is an ultrasonic atomizer 1A that ultrasonically vibrates aqueous alkaline solution 9 to generate mist. Specifically, the ultrasonic atomizer 1A ultrasonically vibrates the aqueous alkaline solution 9 to form a liquid column P that protrudes from the surface W of the aqueous alkaline solution 9, and this disperses a fine mist from the liquid surface. The ultrasonic atomizer 1A in the figure blows a carrier gas over the surface of the aqueous alkaline solution 9 liquid column P to diffuse fine mist (nano-mist) into the carrier gas and form a mist-and-gas mixture. The atomizer 1 is provided with an atomizing chamber 10 that holds aqueous alkaline solution 9, an ultrasonic transducer 11 that ultrasonically vibrates the aqueous alkaline solution 9 to establish a liquid column P that protrudes from the liquid surface W, a high frequency power supply 12 connected to the ultrasonic transducer 11 that supplies high frequency power to the ultrasonic transducer 11 to make it vibrate ultrasonically, and a blower mechanism 20 that blows carrier gas into the atomizing chamber 10 to disperse mist from the surface of the liquid column P and form a mist-and-gas mixture.

The atomizing chamber 10 is an enclosure that holds aqueous alkaline solution 9 with the liquid surface W maintained at a constant level and internally generates mist. Mist generated in the atomizing chamber 10 is diffused into carrier gas blown into the chamber and a mist-and-gas mixture is discharged from the chamber. The atomizing chamber 10 is not necessarily completely closed and can have openings. The atomizing chamber 10 of the ultrasonic atomizer 1A shown in FIG. 2 is provided with an aqueous alkaline solution 9 supply inlet 13 located below the liquid surface. An overflow outlet 14 is opened to maintain the supplied aqueous alkaline solution 9 at a constant level. Aqueous alkaline solution 9 is supplied through the supply inlet 13 and discharged through the overflow outlet 14. While the overflow outlet 14 maintains the aqueous alkaline solution 10 at a constant level in this atomizing chamber 10, a constant liquid surface level can also be maintained by controlling the amount of aqueous alkaline solution introduced through the supply inlet 13. An atomizing chamber 10 that maintains a constant liquid surface level can keep the depth of the aqueous alkaline solution 9 ultrasonically vibrated by the ultrasonic transducer 11 at a value that produces the most efficient atomization.

The aqueous alkaline solution 9 is supplied to the atomizing chamber 10 by a solution supply system 15. The solution supply system 15 shown in FIG. 2 is provided with a solution tank 16 that holds aqueous alkaline solution 9, which is supplied to the atomizing chamber 10, and a solution pump 17 that pumps solution tank 16 aqueous alkaline solution 9 into the atomizing chamber 10. The suction side of the solution pump 17 is connected to the solution tank 16, and the discharge side of the pump is connected to the atomizing chamber 10. This solution supply system 15 continuously supplies aqueous alkaline solution 9 from the solution tank 16 to the atomizing chamber 10 with the solution pump 17.

Figure 3:
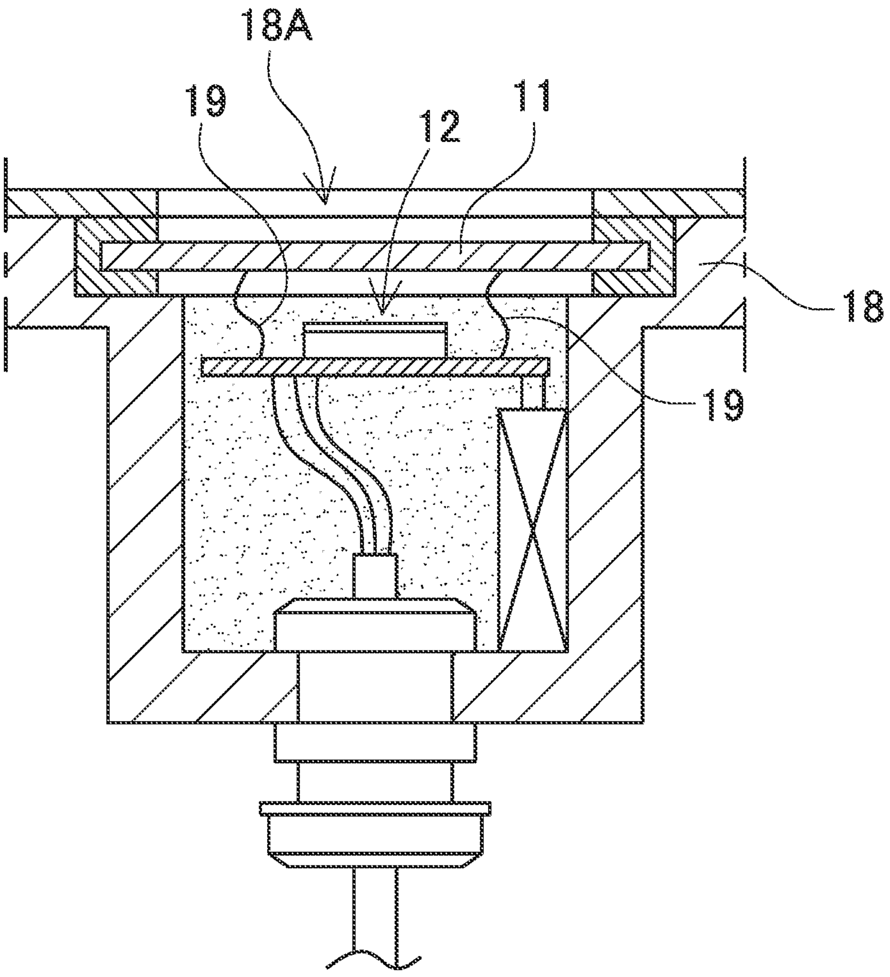
FIG. 3 is an enlarged cross-section showing ultrasonic transducer connecting structure.

The ultrasonic transducer 11 shown in the enlarged cross-section of FIG. 3 is fixed to the bottom plate 18 of the atomizing chamber 10 in a water-tight manner through an opening 18A in the bottom plate 18. The ultrasonic transducer 11 is electrically connected to a high frequency power supply 12 through electrodes established on the bottom surface of the transducer, and is ultrasonically vibrated by power from that high frequency power supply 12. The high frequency power supply 12 is connected to the ultrasonic transducer 11 via lead wires 19 and outputs high frequency power to the ultrasonic transducer 11.

As shown in FIG. 2, the blower mechanism 20 passes carrier gas over the surface of the liquid column P generated by ultrasonic vibration to blow mist from the surface and produce a mist-and-gas mixture. Numerous ultra-fine mist particles separate from the surface H of the ultrasonically vibrated liquid column P and disperse a highly concentrated mist. Carrier gas passed over the liquid column surface H blows-off and disperses mist from the surface H to form the mist-and-gas mixture. Rapidly blowing mist off the liquid column surface H reduces mist concentration at the surface H and has the effect of increasing atomizing efficiency. This is because mist cannot efficiently escape from the liquid column P surface when mist concentration at the surface H is high. Forced flow of carrier gas over the liquid column surface H extracts mist from the surface H, a portion of the fine mist is vaporized, and mist-and-gas mixture cooled by the heat of vaporization is discharged from the atomizer. Increasing the volume of carrier gas flow (i. e. carrier gas flow rate) over the liquid column surface H can increase mist atomizing efficiency. However, in an atomizer 1 that blows carrier gas over the liquid column surface, the concentration of mist in the mist-and-gas mixture can decrease when carrier gas flow rate is further increased. Consequently, carrier gas flow rate is set to an optimum value considering both mist atomizing efficiency and mist concentration in the mist-and-gas mixture. The blower mechanism 20 is controlled by the controller 5 to adjust carrier gas flow rate supplied to the atomizing chamber 10.

The atomizer 1 of FIG. 2 has a horizontally disposed ultrasonic transducer 11, and the liquid column P protrudes vertically from the liquid surface W. However, the atomizer 1 can also have an ultrasonic transducer 11 disposed at an incline and the liquid column P can protrude at an incline with respect to the liquid surface W. Although the atomizer 1 in the figure is equipped with a single ultrasonic transducer 11, a plurality of ultrasonic transducers can also be provided to increase the amount of mist atomized in a given time. Further, the amount of mist generated can be controlled by adjusting power output of the ultrasonic transducer 11.

The atomizer 1 in FIG. 2 is provided with an air heater 21 that heats the carrier gas air and a solution heater 22 that heats the aqueous alkaline solution 9. The atomizer 1 heats the air (carrier gas) and aqueous alkaline solution 9 to increase atomizing efficiency and increase the amount of mist generated in a given time. The air heater 21 and solution heater 22 are controlled by the controller 5 to regulate carrier gas temperature and aqueous alkaline solution temperature.

The aqueous alkaline solution 9 used to form mist in the atomizer 1 is preferably an aqueous solution of sodium hydroxide or potassium hydroxide. Power plants or factories located close to an ocean preferably use sodium hydroxide aqueous solution that can be derived from sea water to reduce operating cost. However, potassium hydroxide aqueous solution can also be used as aqueous alkaline solution. An apparatus that uses potassium hydroxide as aqueous alkaline solution can advantageously utilize nitrogen components included in exhaust gas to form potassium nitrogen fertilizer with the potassium in potassium hydroxide. Potassium nitrogen fertilizer can be effectively used in agriculture as fertilizer containing both nitrogen and potassium. While separating atmospheric pollutants from exhaust gas, this cleaning apparatus also effectively uses nitrogen components in the exhaust gas as fertilizer, and as a result is extremely economic.

The atomizer 1 is controlled by the controller 5. In addition to controlling the atomizer 1, the controller 5 also regulates exhaust gas and mist-and-gas mixture flow rates. The controller adjusts the environment inside the mixer 6 to suppress mist vaporization based on signals input from temperature sensors 27 and 28. Further, the controller 5 regulates exhaust gas and mist-and-gas mixture flow rates, and controls proportions of exhaust gas $SO_x$ and $NO_x$ atmospheric pollutants and alkaline components in the aqueous alkaline solution.

Mixer 6

The mixer 6 mixes mist-and-gas mixture from the atomizer 1 with exhaust gas, and causes atmospheric pollutants included in the exhaust gas to be absorbed in the aqueous alkaline solution mist. The mixer 6 mixes exhaust gas and aqueous alkaline solution mist to absorb $SO_x$ and $NO_x$ atmospheric pollutants into the mist. $SO_x$ atmospheric pollutants react with mist alkaline components and are absorbed in the mist as sulfates; $NO_x$ atmospheric pollutants react with mist alkaline components and are absorbed as nitrates.

The flow rate and temperature of exhaust gas supplied to the mixer 6 affects the amount of mist vaporization inside the mixer 6. If large quantities of high temperature exhaust gas are introduced into the mixer 6, that exhaust gas will heat and vaporize mist. Since atmospheric pollutants are absorbed into liquid mist and separated from the exhaust gas in the mixer 6, atmospheric pollutant separation efficiency is degraded when the mist vaporizes. This adverse effect can be avoided by cooling exhaust gas supplied to the mixer 6 to the dew point (temperature) or below. Exhaust gas temperature is reduced below the dew point and relative humidity is increased when supplied to the mixer 6, and this suppresses mist vaporization. Since vaporization is enhanced when large quantities of low humidity, high temperature exhaust gas is supplied to the mixer 6, exhaust gas is cooled and its relative humidity is increased (relative humidity of mist-and-gas mixture supplied from the atomizer 1 is also controlled) to suppress mist vaporization inside the mixer 6.

Figure 4:
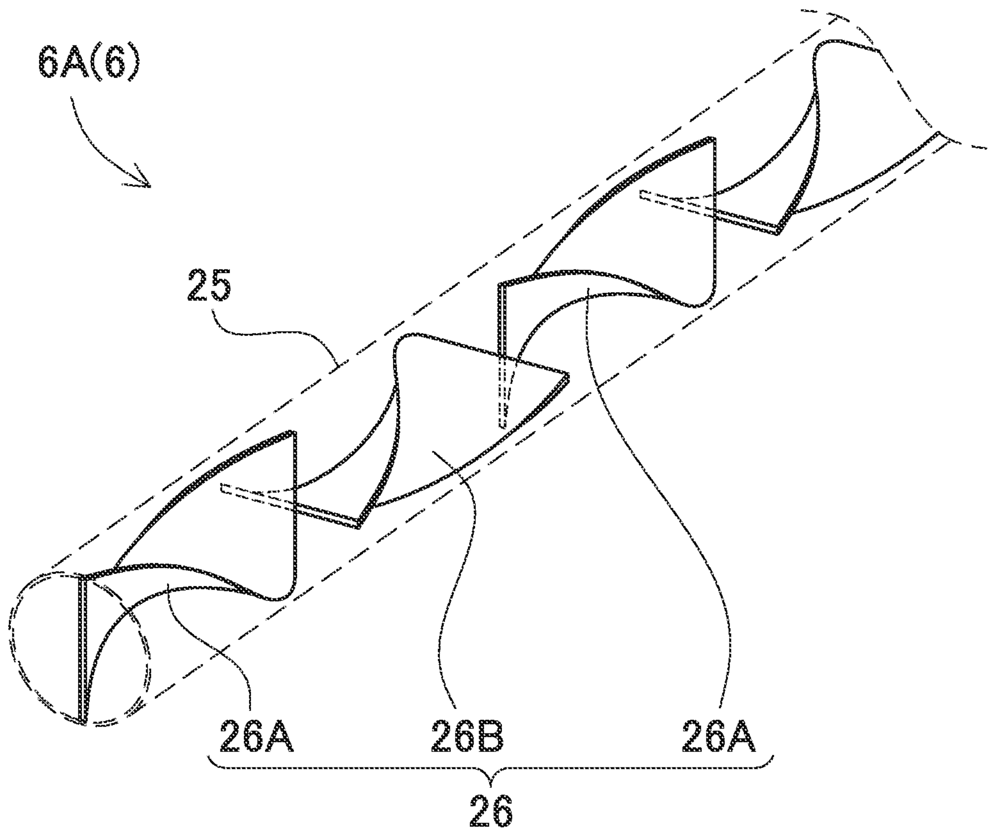
FIG. 4 is a abbreviated oblique diagram showing a static mixer, which is one example of a mixer.

A static mixer is preferably used as the mixer 6. FIG. 4 is an abbreviated oblique diagram illustrating a static mixer. The static mixer 6A has multiple stages of element blades 26 disposed inside duct material 25. The mixer 6A mixes exhaust gas and mist-and-gas mixture flowing through the duct material 25 by alternate left and right flow reversal through element blades 26 disposed in multiple stages. Each element blade 26 is rectangular plate material (e.g. sheet metal) with a width equal to the internal diameter of the duct material 25 and a length 1.5 times the width. Right element blades 26A, which are twisted 180° to the right, and left element blades 26B, which are twisted 180° to the left, are disposed alternately in the flow direction inside the duct material 25. Adjacent right element blades 26A and left element blades 26B are disposed inside the duct material 25 with blade ends at right angles at each boundary between element blades. Flow through this static mixer 6A is split in half and rotation is reversed each time flow enters the downstream element blade 26 of an adjacent element blade 26 pair. By increasing the number of stages of alternately disposed right element blades 26A and left element blades 26B, this static mixer 6A can more uniformly mix the exhaust gas and mist-and-gas mixture.

In this static mixer 6A, flow splits in half each time it enters the next element blade 26. For example, a static mixer 6A with 20 stages of right element blades 26A and left element blades 26B divides flow through the mixer a total of $2^{20}$ (1048576) times. Consequently, exhaust gas and mist-and-gas mixture are efficiently mixed, exhaust gas and mist-and-gas mixture are effectively put in close contact, and atmospheric pollutants can readily dissolve in the aqueous alkaline solution mist. Since the total length of each right element blade 26A and left element blade 26B is short (i.e. 1.5 times the width), the number of element blade stages can be numerous while keeping overall mixer length short. Accordingly, a static mixer of limited length can efficiently mix the two fluids and exhaust gas atmospheric pollutants can be efficiently absorbed in the aqueous alkaline solution mist. However, making element blades longer also results in efficient atmospheric pollutant absorption into aqueous alkaline solution mist.

Mist absorbs exhaust gas atmospheric pollutants with aqueous alkaline solution mist maintained in the mist state. As described above, for efficient absorption of exhaust gas atmospheric pollutants into aqueous alkaline solution mist, it is important to suppress mist vaporization inside the mixer 6. The cleaning apparatus 100 in FIG. 1 is provided with temperature sensor 27 and temperature sensor 28 that detect temperature inside the mixer 6 to suppress mist vaporization in the mixer 6. Temperature sensor 27, 28 detection signals are sent to the controller 5, and the controller 5 regulates temperature and humidity inside the mixer 6 to suppress mist vaporization.

Controller 5

The controller 5 controls the temperature and flow rate of mist-and-gas mixture and exhaust gas supplied to the mixer 6 to suppress mist vaporization inside the mixer 6. The controller 5 regulates the flow rate and temperature of carrier gas (air) supplied to the atomizer 1, regulates the temperature of the ultrasonically vibrated aqueous alkaline solution, and controls the temperature and humidity of the mist-and-gas mixture supplied to the mixer 6. If the air flow rate is high and mist-and-gas mixture temperature is high, relative humidity inside the mixer 6 decreases and mist can easily vaporize. Accordingly, the controller 5 detects temperature and humidity inside the mixer 6, regulates the air heater 21 and the solution heater 22, and adjusts air flow rate into the atomizer 1 to keep relative humidity inside the mixer 6 within a set range.

The controller 5 controls the supply fan 29 to regulate the flow rate of gas mixture supplied to the mixer 6 and controls the supply fan 24 to regulate the flow rate of outside air mixed with exhaust gas in the oxidizing unit 8 to keep relative humidity inside the mixer 6 within the set range. The inside of the mixer 6 is preferably in a supersaturated state with relative humidity greater than or equal to 100%. Namely, mixer 6 internal temperature is at or below the dew point to effectively suppress mist vaporization.

Atomizing efficiency of the atomizer 1 can be optimized by adjusting the temperature and flow rate of gas blown at the liquid column P. Atomizing efficiency can also be increased by heating the aqueous alkaline solution 9. The controller 5 adjusts the flow rate and temperature of carrier gas blown at the liquid column P considering atomizing efficiency. If the temperature of gas blown at the liquid column P is too high, aqueous alkaline solution vaporizes and this causes reduced atomizing efficiency. In the mixer as well, mist vaporization also causes reduced atmospheric pollutant separation.

In an atomizer 1 where air is blown as the carrier gas at the surface of the liquid column P, the controller 5 regulates air flow rate and temperature to increase atomizing efficiency. While the atomizing efficiency of this atomizer 1 can be increased by increasing carrier gas (air) flow rate and temperature, the percentage of mist vaporized inside the mixer 6 increases. Therefore, (considering this trade-off) the controller 5 detects temperature and humidity inside the mixer 6 and adjusts the flow rate and temperature of air supplied to the atomizer 1 and blown at the liquid column P. Ideally, the controller 5 keeps atomizing efficiency high with air flow rate and temperature set high while maintaining moisture conditions inside the mixer 6 that attain a supersaturated or nearly supersaturated state to suppress mist vaporization. In an atomizer 1 provided with a solution heater 22, aqueous alkaline solution temperature is increased within a range that allows supersaturated or nearly supersaturated conditions to be maintained inside the mixer 6.

Separator 7

Figure 5:
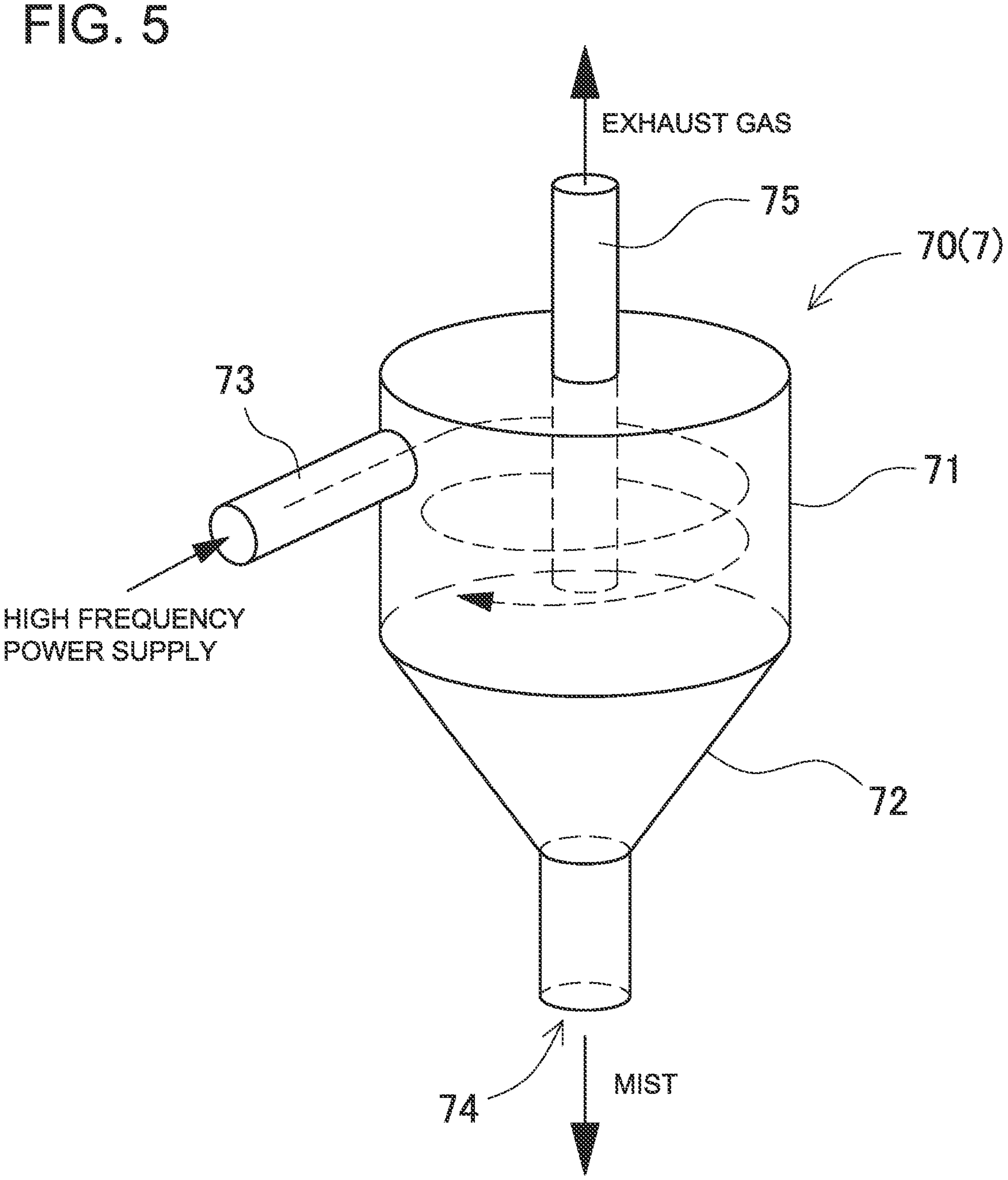
FIG. 5 is an abbreviated oblique diagram showing a cyclone separator, which is one example of a separator.

The separator 7 separates mist that has absorbed atmospheric pollutants from the exhaust gas. For example, the separator 7 in the cleaning apparatus 100 is a cyclone separator. A cyclone separator can efficiently separate mist with a simple structure. The cyclone separator 70 shown in FIG. 5 has a cylindrical shape with cylinder region 71 and a tapered region 72 that narrows towards the bottom of the separator. The cyclone separator 70 circulates exhaust gas that contains mist internally in vortex fashion and separates mist from the exhaust gas by centrifugal force. Namely, the cyclone separator 70 separates mist due to the action of centrifugal force. The rotating mist redistributes to move to the outside due to centrifugal force. Centrifugal force that acts on the mist increases in proportion to the mass of the mist. Mass of the mist is large compared to mass of the exhaust gas, and mist particle mass increases in proportion to the cube of the mist particle radius. Mist particles generated by ultrasonic vibration with size on the order of micrometers have much greater mass than mist particles with size on the order of nanometers, and those larger particles can increase separation efficiency of the cyclone separator 70. Since the ultrasonic atomizer 1A efficiently generates micron-order mist particles, mist produced by the ultrasonic atomizer 1A can be efficiently separated from exhaust gas by the cyclone separator 70.

To rapidly circulate exhaust gas that includes mist (i.e. mist-and-gas mixture combined with exhaust gas), the cyclone separator 70 has an inlet duct 73 connected to the cylinder region 71 that introduces the exhaust gas including mist in a tangential direction (with respect to the cylinder region 71). Exhaust gas including mist that flows tangentially into the cylinder region 71 from the inlet duct 73 rapidly circulates inside the cylinder region 71. Mist in the exhaust gas rapidly rotated inside the cylinder region 71 moves towards the outside of the cylinder region 71 due to centrifugal force. Mist forced to the outside of the cylinder region 71 makes contact with the inside surface of the cylinder region wall and flows as a liquid down the cylinder region wall into the tapered region 72. To discharge liquid that flows into the tapered region 72, a liquid outlet 74 is established at the bottom of the tapered region 72. Exhaust gas from which mist has been separated is discharged outside the separator through an exhaust duct 75, which is disposed at the center of the cylinder region 71 and extends vertically in an axial direction. Exhaust gas, which has less specific gravity than the mist is less affected by centrifugal force and can be discharged to the outside from center of the cylinder region 71.

While the separator 7 described above separates mist from exhaust gas with a single cyclone separator 70, a multi-cyclone separator having a plurality of cyclone separators connected in series and parallel can be used to more efficiently separate mist. A multi-cyclone separator has inlet-side cyclone separator(s) connected with outlet-side cyclone separators. Outlet-side cyclone separators are a plurality of cyclone separators, which are smaller than inlet-side cyclone separator(s), connected in parallel. The exhaust duct of an inlet-side cyclone separator branches to connect with inlet ducts of the outlet-side cyclone separators. Exhaust gas including mist, from which (some) mist has been separated by an inlet-side separator, branches into inlet ducts of the outlet-side cyclone separators. The outlet-side cyclone separators further separate mist from the exhaust gas and mist input from the inlet-side separators. A multi-cyclone separator separates mist from exhaust gas that includes mist with both inlet-side separator(s) and outlet-side separators, and this efficiently separates mist.

The cyclone separator 70 can efficiently separate mist with a simple structure. However, the present invention is not specified to have a separator 7 that is a cyclone separator 70, and any separator that can separate mist from exhaust gas (that includes mist) can be used. For example, devices that are already in use such as a static electricity separator or de-mister can also be used. A static electricity separator has discharge electrode(s) that charge mist particles in the flow path of the exhaust gas that includes mist, and collector electrode(s) to which the electro-statically charged mist particles adhere for separation. Since a static electricity separator adheres and collects mist particles electro-statically, smaller mist particles can be separated efficiently.

Oxidizing Unit 8

The oxidizing unit 8 oxidizes exhaust gas $NO_1$ to form $NO_2$. Exhaust gas contains $NO_x$ in the form of $NO_1$ and $NO_2$, but $NO_1$ is not very soluble in water (i.e. aqueous solution). To oxidize exhaust gas $NO_1$ and form more soluble $NO_2$, the cleaning apparatus 100 in FIG. 1 is provided with an oxidizing unit 8 that mixes an oxygen containing gas, namely outside air, with the exhaust gas. The oxidizing unit 8 mixes outside air as oxygen containing gas with the exhaust gas to oxidize $NO_1$ and form $NO_2$. Exhaust gas $NO_1$ is easily oxidized and combines with oxygen in air to make $NO_2$. Outside air mixed with exhaust gas not only oxidizes $NO_1$, but also reduces the temperature of exhaust discharged in a high temperature state from sources such as a blast furnace or power plant and can cool the exhaust gas to the dew point or below. Supersaturated water vapor in exhaust gas cooled to the dew point or below condenses in the form of fine water droplets. Consequently, in exhaust gas mixed with outside air, $NO_1$ is converted to $NO_2$ and exhaust gas cooled to or below the dew point is in a supersaturated state. Exhaust gas cooled by outside air can be cooled to lower temperatures by increasing the amount of outside air mixed with the exhaust gas. The amount of outside air mixed with the exhaust gas is preferably adjusted to lower the temperature to or below the dew point (e.g. less than or equal to 150° C.). While the cleaning apparatus 100 in FIG. 1 oxidizes $NO_1$ to form $NO_2$ by mixing outside air with the exhaust gas, $NO_1$ can also be oxidized to form $NO_2$ via mist-and-gas mixture supplied from the atomizer 1 (without mixing outside air with the exhaust gas).

Exhaust gas with $NO_1$ oxidized to $NO_2$ by the oxidizing unit 8 is supplied to the mixer 6. The cleaning apparatus 100 in FIG. 1 has the oxidizing unit 8 connected to the inlet side of the mixer 6. This oxidizing unit 8 supplies exhaust gas $NO_1$ to the mixer 6 as $NO_2$. While the cleaning apparatus 100 in FIG. 1 has the oxidizing unit 8 connected to the outlet side of the PM separator 3, the oxidizing unit 8 could also be connected to the inlet side of the PM separator.

PM Separator 3

The cleaning apparatus 100 in FIG. 1 is also provided with a PM separator 3 that removes particulate matter from the exhaust gas. The PM separator 3 is disposed at the input side of the cleaning apparatus 100, which separates atmospheric pollutants from exhaust gas that has particulate matter removed. Atmospheric pollutants can be efficiently separated from exhaust gas that has particulate matter removed by the PM separator 3. However, the cleaning apparatus can also separate atmospheric pollutants from exhaust gas without removing particulate matter with a PM separator. This is because an apparatus that separates atmospheric pollutants from exhaust gas containing particulate matter is equipped with a separator (e.g. cyclone separator) that separates atmospheric pollutants absorbed in mist and particulate matter can also be removed from the exhaust gas by this separator. However, in a cleaning apparatus 100 that supplies exhaust gas to the separator with particulate matter removed, there is no requirement for the separator to remove particulate matter and atmospheric pollutants can be efficiently separated.

Figure 6:
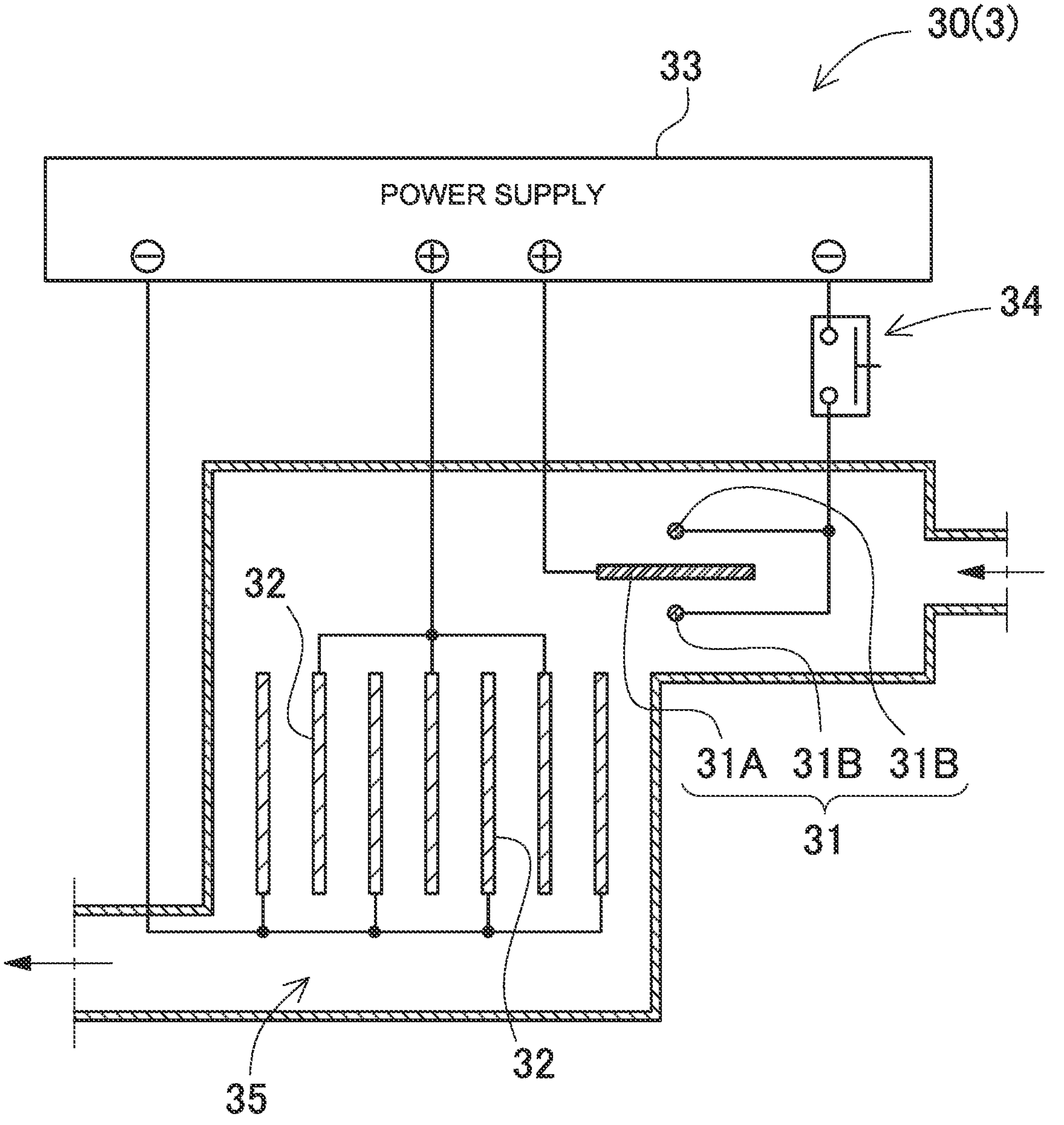
FIG. 6 is a schematic diagram showing one example of a particulate material (PM) separator.

The PM separator 3 can employ, for example, an electrostatic dust collector to effectively remove extremely small particles. As shown in FIG. 6, the electrostatic dust collector 30 is provided with discharge electrodes 31, collector electrodes 32, and a power supply 33 to separate fine particulates from exhaust gas via the action of static electricity.

The discharge electrodes 31 have a positive electrode 31A and negative electrodes 31B disposed in opposition within the air (gas) circulation path 35. The negative electrodes 31B are two thin metal wires disposed in a parallel configuration via insulating material (not illustrated). A positive electrode 31A in the form of a plate is disposed between the two negative electrodes 31B. The positive electrode 31A is fixed in an orientation parallel to the air flow direction to allow air to flow smoothly around the positive electrode plate. The positive electrode 31A is directly connected, and the negative electrodes 31B are connected through a switch 34 to the power supply 33. The power supply 33 applies a voltage that can induce corona discharge (e.g. 3000V to 10000V) between the positive electrode 31A and negative electrodes 31B. When the switch 34 is on, high negative potential is applied to the negative electrodes 31B. The positive electrode 31A is connected to the power supply ground. In normal operation, metal wire negative electrodes 31B are connected to the negative side of the power supply 33, and the positive electrode 31A plate is connected to positive side of the power supply 33 to induce negative corona discharge. This is because negative corona discharge causes higher current flow than positive corona discharge and enables particulate matter in the air to be effectively electro-statically charged. However, the metal wire electrodes could also be connected to the positive side of the power supply to act as positive electrodes, and the plate electrode could be connected to the negative side of the power supply to act as a negative electrode.

The collector electrodes 32 are disposed within the air (gas) circulation path 35 closer to the air outlet than the discharge electrodes 31. The collector electrodes 32 cause particulate matter charged by the discharge electrodes 31 to adhere to the collector electrodes 32 via electro-static attraction. Accordingly, the collector electrodes 32 are plate electrodes disposed in parallel orientation via insulating material. The collector electrode plates are connected to the power supply 33 and a potential (e.g. 2000V to 15000V) capable of attracting and adhering particulate matter is imposed on the electrodes by the power supply 33.

The electrostatic dust collector 30 described above electro-statically charges particulate matter included in exhaust gas with the discharge electrodes 31, and recovers the charged particulate matter on the surface of the collector electrodes 32 by electro-static adhesion. The electrostatic dust collector 30 can efficiently collect extremely small particles included in the exhaust gas. However, the PM separator does not necessarily employ an electrostatic dust collector, and any equipment that can separate particulate matter from exhaust gas (e.g. a bag filter or cyclone separator) can also be used.

The cleaning apparatus 100 in FIG. 1 separates atmospheric pollutants from exhaust gas by the following processing steps. Since the cleaning apparatus 100 in this figure is provided with a PM separator 3 at the input side, atmospheric pollutants are separated from exhaust gas that has particulate matter removed by the PM separator 3.

PM Separating Step

This processing step separates particulate matter from exhaust gas supplied to the mixer 6. The cleaning apparatus 100 in FIG. 1 has a PM separator 3 disposed at the inlet side of the mixer 6, and $SO_x$ and $NO_x$ atmospheric pollutants are separated from exhaust gas after the PM separator 3 has removed particulate matter from that exhaust gas.

Atomizing Step

The atomizing step forms mist from an aqueous alkaline solution with the atomizer 1. The atomizer 1 makes mist from aqueous alkaline solution and mixes that mist with a carrier gas to form a mist-and-gas mixture. The atomizer 1 makes mist from caustic soda (sodium hydroxide) used as the aqueous alkaline solution. However, the aqueous alkaline solution used by the atomizer 1 to form mist is not specifically limited to caustic soda (sodium hydroxide). For example, aqueous solutions of other alkaline metals such as potassium hydroxide can also be used. As shown in FIG. 2, the atomizer 1 generates mist by blowing carrier gas at the surface of a column of liquid P that protrudes from the solution surface due to ultrasonic vibration induced by an ultrasonic transducer 11. The carrier gas blows mist off the surface of the liquid column P to generate a mist-and-gas mixture. Mist absorption of atmospheric pollutants can be controlled by adjusting sodium hydroxide concentration. For example, aqueous alkaline solution concentration in the mist is greater than or equal to 1% by volume. By increasing aqueous alkaline solution concentration in the mist, atmospheric pollutants can be efficiently absorbed. Accordingly, aqueous alkaline solution concentration in the mist is preferably made as high as possible without supersaturating the mist with sodium hydroxide or potassium hydroxide etc.

Mixing Step

The mixing step mixes exhaust gas with mist-and-gas mixture in the mixer 6, induces exhaust gas atmospheric pollutant absorption into the mist. For example, the mixing step mixes exhaust gas and mist-and-gas mixture with a static mixer 6A to absorb exhaust gas atmospheric pollutants in the mist. The static mixer 6A mixes mist-and-gas mixture supplied from the atomizer 1 with exhaust gas to absorb exhaust gas atmospheric pollutants in aqueous alkaline solution mist. $SO_x$ atmospheric pollutants react with mist alkaline components and are absorbed in the mist as sulfates; $NO_x$ atmospheric pollutants react with mist alkaline components and are absorbed as nitrates.

The cleaning apparatus 100 in FIG. 1 has an oxidizing unit 8, which oxidizes exhaust gas $NO_1$ to form $NO_2$, connected to the inlet side of the mixer 6. Accordingly, an oxidizing step that supplies an oxygen containing gas to the exhaust gas is included as pre-processing for the mixing step. In this oxidizing step, the oxidizing unit 8 oxidizes exhaust gas $NO_1$ to form $NO_2$. $NO_1$ atmospheric pollutant is oxidized and absorbed into the mist as $NO_2$.

Separating Step

The separating step separates mist, which absorbed atmospheric pollutants, from exhaust gas using a separator 7 connected to the outlet side of the mixer 6. For example, the separating step separates mist, which absorbed atmospheric pollutants, from exhaust gas using a cyclone separator 70 as the separator 7.

The cleaning apparatus 100 in FIG. 1 separates atmospheric pollutants from exhaust gas by the processing steps described above. Here, the controller 5 controls the atomizer 1 and mixer 6 to allow efficient separation of atmospheric pollutants from exhaust gas. The controller 5 detects temperature and humidity inside the mixer 6 to preferably maintain temperature inside the mixer at or below the dew point. In addition, the controller 5 adjusts parameters such as carrier gas (air) temperature and flow rate as well as the temperature to which aqueous alkaline solution is heated to enable efficient atomization of aqueous alkaline solution to form mist. Further, the controller 5 regulates temperatures and flow rates (i.e. flow rate ratio) of exhaust gas and carrier gas to effectively put exhaust gas in contact with mist inside the mixer 6 and efficiently absorb atmospheric pollutants into the mist. While the previously described cleaning apparatus 100 utilizes sodium hydroxide as alkaline component in the mist, the alkaline component can also be potassium hydroxide. Potassium hydroxide can react with atmospheric pollutants, and nitrogen potassium fertilizer can be recovered from the cyclone separator 70.

Second Embodiment

Figure 7:
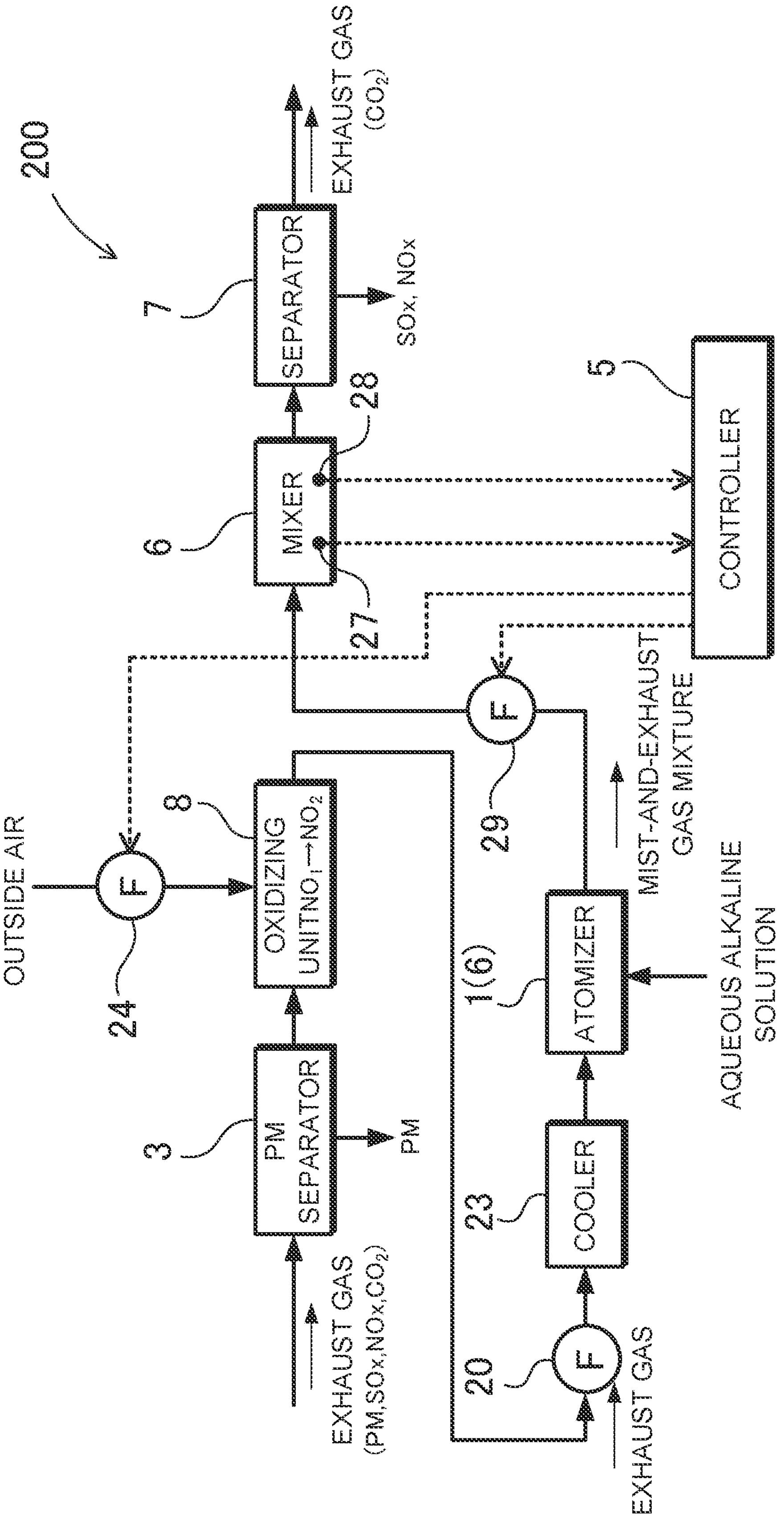
FIG. 7 is a block diagram of the cleaning apparatus for the second embodiment of the present invention.

The cleaning apparatus 200 in FIG. 7 supplies exhaust gas to the atomizer 1. This atomizer 1 is equipped with a blower mechanism 20 that passes exhaust gas over the surface of a liquid column P generated by ultrasonic vibration and blows mist off the surface of the liquid column P to form a mist-and-exhaust gas mixture. The exhaust gas has a high temperature and contains large amounts of water vapor. Exhaust gas is cooled to the dew point or below by a cooler 23 to suppress mist vaporization. This is because mist is easily vaporized when exhaust gas temperature is above the dew point. While exhaust gas is ideally supplied to the atomizer 1 at a temperature below the dew point, exhaust gas temperature is not always necessarily at or below the dew point. For example, exhaust gas cooled to a temperature that raises relative humidity above a threshold value can also be supplied to the atomizer 1. To suppress mist vaporization in the atomizer 1, the relative humidity threshold value is preferably greater than or equal to 80%. For exhaust gas supplied to the atomizer 1 at a temperature above the dew point, a portion of the mist is vaporized, but temperature is lowered due to cooling by the heat of vaporization. Temperature of exhaust gas input to the atomizer 1 is set, for example, to a value that keeps the amount of mist vaporization in the mist-and-exhaust gas mixture inside the atomizer 1 less than or equal to 50%. In that case, more than half of the mist can dissolve and separate $SO_x$ and $NO_2$ atmospheric pollutants.

In the cleaning apparatus 200, since exhaust gas is supplied to the atomizer 1 as carrier gas and mist-and-exhaust gas mixture is formed, exhaust gas and mist are mixed in the atomizer 1 and exhaust gas atmospheric pollutants can be absorbed into the mist. The atomizer 1 in the cleaning apparatus 200 can serve the dual purpose as atomizer and mixer in a single unit, and the outlet side of the atomizer 1 does not necessarily have to connect to a mixer. A cleaning apparatus with an atomizer that also serves as a mixer can connect directly to the separator without an intervening mixer, and mist can be separated from the exhaust gas to separate atmospheric pollutants. However, the cleaning apparatus 200 in FIG. 7 has a mixer 6 connected to the outlet side of the atomizer 1. In this cleaning apparatus 200, mist-and-exhaust gas mixture mixed in the atomizer 1 is further agitated and mixed in the mixer 6, and this even more effectively absorbs atmospheric pollutants into the mist. Since the cleaning apparatus 200 in FIG. 7 does not blow a carrier gas such as air into the atomizer 1, mist-and-exhaust gas mixture input to the separator 7 can have higher mist concentration. This separator 7 can efficiently separate mist from a mist-and-exhaust gas mixture, which has a high mist concentration.

Third Embodiment

Figure 8:
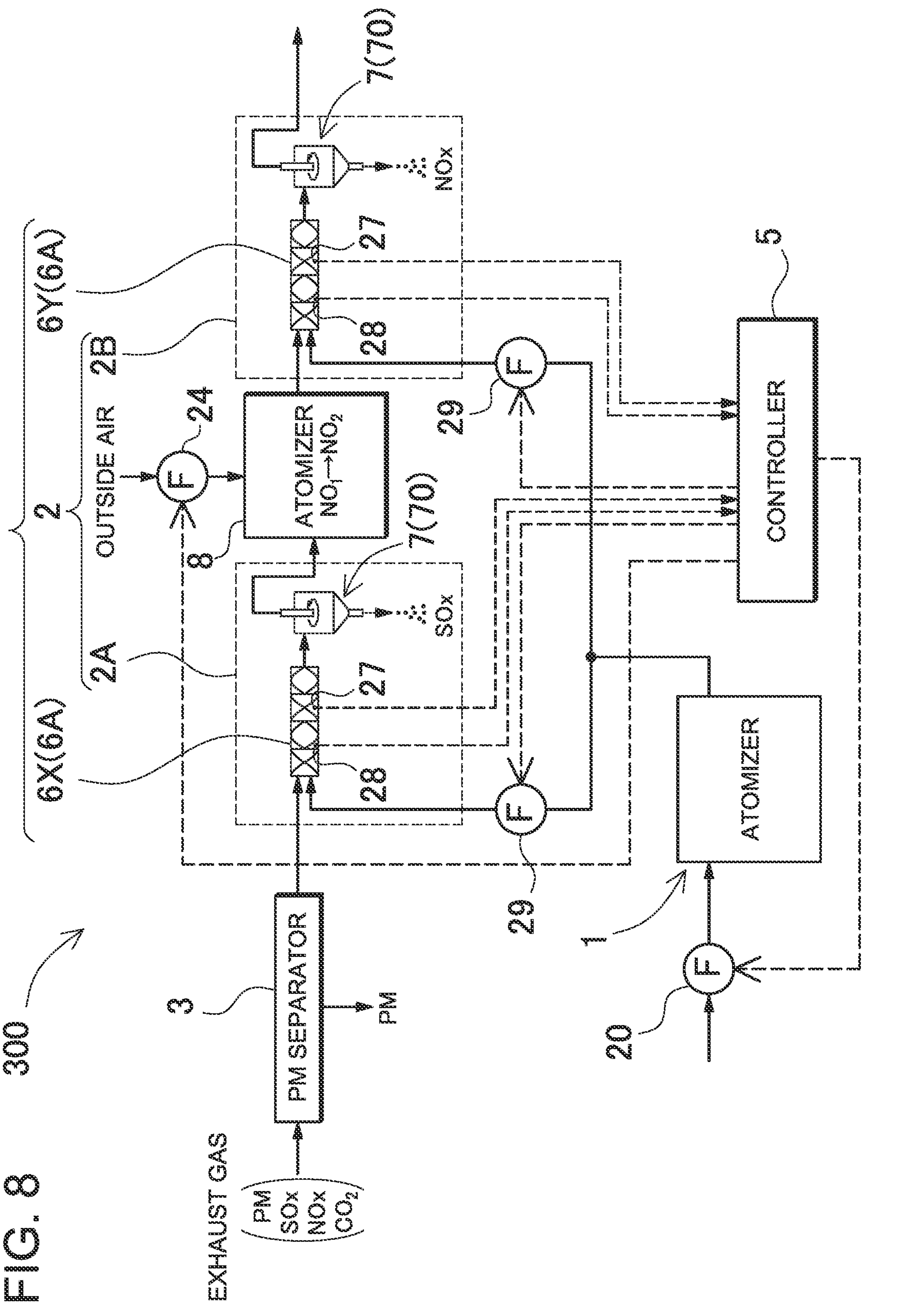
FIG. 8 is a schematic diagram of the cleaning apparatus for the third embodiment of the present invention.

The cleaning apparatus 300 in FIG. 8 separates $SO_x$ and $NO_x$ via two processing steps. This cleaning apparatus 300 has two separating units 2 with a mixer 6 and separator 7 in each unit. Specifically, atmospheric pollutant $SO_x$ and $NO_x$ are separated via a series connected first separating unit 2A and second separating unit 2B. Each separating unit 2 has a cyclone separator 70 (serving as the separator 7) connected to the outlet side of a static mixer 6A (serving as the mixer 6). The cleaning apparatus 300 in the figure has the first separating unit 2A outlet side connected to the second separating unit 2B. Specifically, the mixer 6 shown in FIG. 8 is provided with a first mixer 6X and a series connected second mixer 6Y. The first mixer 6X is disposed in the first separating unit 2A and the second mixer 6Y is disposed in the second separating unit 2B. The second mixer 6Y is connected to the outlet side of the first mixer 6X. Mist-and-gas mixture is supplied from the atomizer 1 to both the first mixer 6X and the second mixer 6Y.

The first separating unit 2A primarily absorbs exhaust gas $SO_x$ into mist in the first mixer 6X to separate atmospheric pollutant $SO_x$ from the exhaust gas, and the second separating unit 2B primarily absorbs exhaust gas $NO_x$ into mist in the second mixer 6Y to separate atmospheric pollutant $NO_x$ from the exhaust gas. Since $SO_x$ is more reactive with aqueous alkaline solution than $NO_x$ and is efficiently absorbed by contact with alkaline mist, $SO_x$ is separated first. The second separating unit 2B separates $NO_x$ from exhaust gas that has been treated by the first separating unit 2A to remove $SO_x$. A cleaning apparatus 300 with a series connected first separating unit 2A and second separating unit 2B can efficiently separate $SO_x$ and $NO_x$ atmospheric pollutants. This is because the mixer 6 established in the second separating unit 2B puts $NO_x$ atmospheric pollutants in contact with aqueous alkaline solution mist that has not absorbed atmospheric pollutants (mist supplied directly from the atomizer 1) for efficient $NO_x$ absorption.

Since the cleaning apparatus 300 in FIG. 8 has an oxidizing unit 8, which oxidizes exhaust gas $NO_1$ to form $NO_2$, connected between the first separating unit 2A and the second separating unit 2B, atmospheric pollutant $NO_1$ is oxidized to form $NO_2$ and supplied to the second separating unit 2B. $NO_2$ oxidized by the oxidizing unit 8 is absorbed into mist in the second mixer 6Y in the second separating unit 2B and separated from exhaust gas by the separator 7. This oxidizing unit 8 converts $NO_1$ in $SO_x$ removed exhaust gas to $NO_2$ and supplies it to the second separating unit 2B. While the oxidizing unit 8 is connected between the first separating unit 2A and the second separating unit 2B in the cleaning apparatus 300 in FIG. 8, the oxidizing unit 8 could be connected to the inlet side of the first separating unit 2A to oxidize $NO_1$ and form $NO_2$. Accordingly, the cleaning apparatus 300 can have the oxidizing unit 8 connected to the inlet side of the first separating unit 2A or to the inlet side of the PM separator 3.

Further, since the cleaning apparatus 300 in FIG. 8 is provided with a PM separator 3 disposed at the input side, atmospheric pollutants can be efficiently separated from exhaust gas that has particulate matter removed by the PM separator 3.

The cleaning apparatus 300 in FIG. 8 separates atmospheric pollutants from exhaust gas by the following processing steps.

PM Separating Step

This processing step separates particulate matter from exhaust gas supplied to the mixer 6. The cleaning apparatus 300 in FIG. 8 has a PM separator 3 disposed at the inlet side of the mixer 6, and $SO_x$ and $NO_x$ atmospheric pollutants are separated from exhaust gas after the PM separator 3 has removed particulate matter from that exhaust gas.

Atomizing Step

In this processing step, the atomizer 1 forms mist by ultrasonic vibration of sodium hydroxide aqueous alkaline solution, and mixes that mist with a carrier gas to form a mist-and-gas mixture. Since the cleaning apparatus 300 in FIG. 8 supplies mist-and-gas mixture to both the first separating unit 2A and the second separating unit 2B with a single atomizer 1, aqueous alkaline solution 9 concentration in the mist-and-gas mixture can be adjusted and optimized for each separating unit 2. For example, aqueous alkaline solution concentration in the mist is greater than or equal to 1% by volume. By increasing aqueous alkaline solution concentration in the mist, atmospheric pollutants can be more efficiently absorbed. Accordingly, aqueous alkaline solution concentration in the mist is preferably made as high as possible without supersaturating the mist with sodium hydroxide or potassium hydroxide etc.

Mixing and Separating Step

Since the cleaning apparatus 300 in FIG. 8 has a mixer 6 and separator 7 provided in each separating unit 2, atmospheric pollutants included in exhaust gas are separated from the exhaust gas in each separating unit 2 by the mixing and separating processing step. The first separating unit 2A and second separating unit 2B are each equipped with a mixer 6 that is a static mixer 6A and a separator 7 that is a cyclone separator 70.

In the mixing process, mist-and-gas mixture from the atomizer 1 is mixed with exhaust gas in each mixer 6, and this induces absorption of exhaust gas atmospheric pollutants into the mist. This mixing process includes a first mixing process that absorbs atmospheric pollutants into mist in the first mixer of the first separating unit 2A, and a second mixing process that absorbs atmospheric pollutants into mist in the second mixer of the second separating unit 2B. In the first mixing process, exhaust gas supplied to the first mixer 6X is mixed with mist-and-gas mixture and primarily exhaust gas $SO_x$ is absorbed into the mist. $SO_x$ reacts with alkaline components in the mist and is absorbed into the mist as sulfates primarily in the first separating unit 2A. Further, in the second mixing process, exhaust gas with $SO_x$ removed by passage through the first mixer 6X is mixed with mist-and-gas mixture in the second mixer 6Y and $NO_x$ is absorbed into the mist. Exhaust gas $NO_x$ reacts with alkaline components in the mist and is absorbed into the mist as nitrates in the second separating unit 2B.

In the separating process, the separator 7, which is a cyclone separator 70, separates mist that has absorbed atmospheric pollutants from exhaust gas. Specifically, the cyclone separator 70 in the first separating unit 2A separates $SO_x$ primarily absorbed in mist as sulfates from the exhaust gas, and the cyclone separator 70 in the second separating unit 2B separates $NO_x$ primarily absorbed in mist as nitrates from the exhaust gas.

The cleaning apparatus 300 in FIG. 8 has an oxidizing unit 8 connected between the first separating unit 2A and the second separating unit 2B. In this cleaning apparatus 300, exhaust gas, which has particulate matter removed by the PM separator 3, initially has $SO_x$ separated by the first separating unit 2A. $SO_x$ is more reactive with alkaline components than $NO_x$ and reacts with mist alkaline components and is absorbed in the mist as sulfates before $NO_x$. In the oxidizing step, exhaust gas that has $SO_x$ removed by mist absorption is oxidized in the oxidizing unit 8 to convert $NO_1$ to $NO_2$. Subsequently, in the second separating unit 2B, $NO_x$ reacts with mist alkaline components and is absorbed into the mist as nitrates. In a first separating unit 2A with sodium hydroxide as alkaline component, $SO_x$ reacts with sodium hydroxide and is absorbed in the mist as sodium sulfate. In the second separating unit 2B, $NO_x$ reacts with sodium hydroxide and is absorbed in the mist as sodium nitrate.

Fourth, Fifth, and Sixth Embodiments

Figure 9:
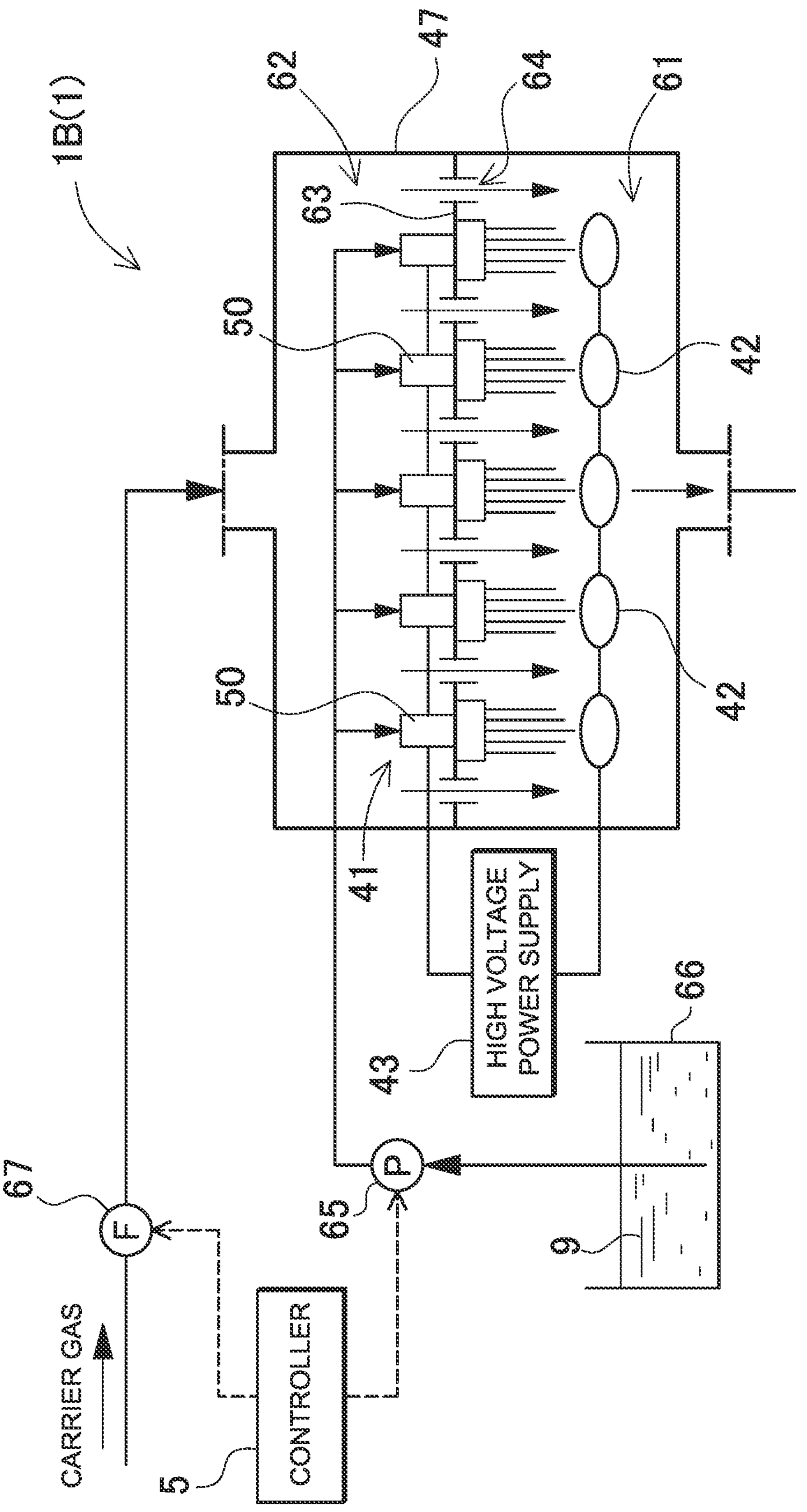
FIG. 9 is a schematic diagram showing a static electricity atomizer, which is another example of an atomizer.

While the cleaning apparatus 100, 200, 300 described above generate fine mist by ultrasonic vibration of aqueous alkaline solution, cleaning apparatus for the fourth, fifth, and sixth embodiments generate aqueous alkaline solution mist with a static electricity atomizer. (The fourth, fifth, and sixth embodiments are the same as the first, second, and third embodiments respectively except that the atomizer is a static electricity atomizer). As shown in FIG. 9, the static electricity atomizer is provided with a spray assembly 41 that has a plurality of nozzles disposed in the upper part of an enclosed spray case 47. The spray assembly 41 sprays aqueous alkaline solution from above to below inside the spray case 47. In addition, the static electricity atomizer 1B has atomizing electrodes 42 disposed inside the spray case 47 that convert spray from the spray assembly 41 to fine mist via electrostatic action.

Figure 10:
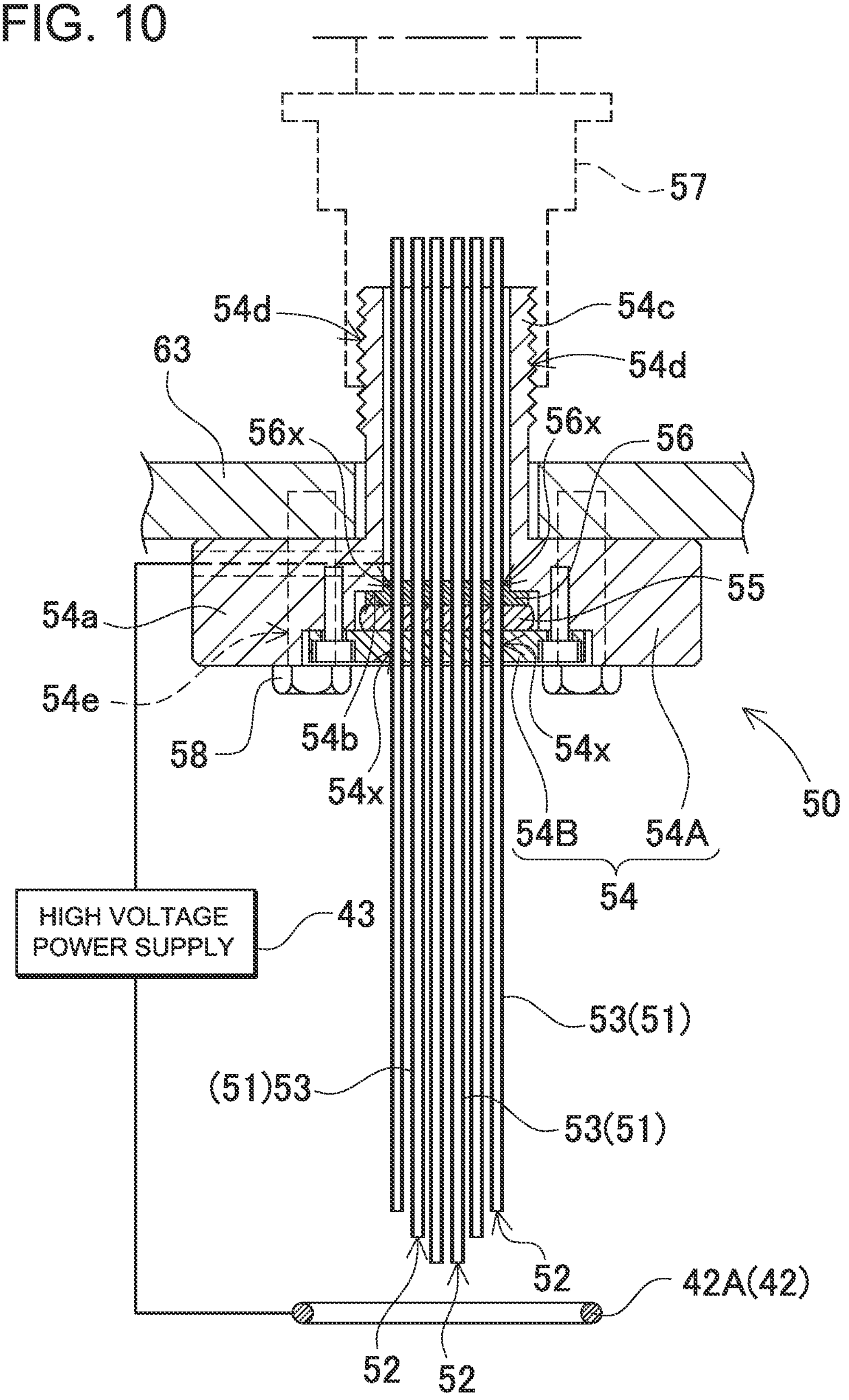
FIG. 10 is an enlarged cross-section showing a mist spray unit (nozzle unit) of the static electricity atomizer shown in FIG. 9.

The static electricity atomizer 1B shown in FIG. 9 incorporates the spray assembly 41, which is made up of a plurality of nozzle units 50, inside the spray case 47. A nozzle unit 50 is illustrated in FIG. 10. The nozzle unit 50 shown in this figure has a plurality of capillary tubes 53 fixed in parallel orientation within a nozzle block 54. Each capillary tube 53 is a thin metal tube with inside diameter from 0.1 mm to 0.2 mm that ejects aqueous alkaline solution under pressure from the end of the tube to spray the aqueous alkaline solution as a mist.

The nozzle block 54 has a flange region 54*a* inside the outside perimeter and holds a plurality of capillary tubes 53 at its center region. The nozzle block 54 in FIG. 10 has a plate 54B, to which capillary tubes 53 are fixed, bolt-attached to the main body 54A of the nozzle block 54, which includes the flange region 54*a*. The plate 54B is provided with through-holes 54*x* in which the capillary tubes 53 are inserted. Inside diameter of the through-holes 54*x* is approximately equal to the outside diameter of the capillary tubes 53, and the capillary tubes 53 insert into the through-holes 54*x* with minimum clearance. To prevent solution leakage between the capillary tubes 53 and the through-holes 54*x*, a gasket 55 is disposed on the inside surface of the plate 54B. The gasket 55 is flexible rubber-like material that seals gaps between the capillary tubes 53 and the plate 54B in an air-tight manner. A sandwiching plate 56 is disposed to retain the gasket 55 in a compressed state. The gasket 55 is secured to the main body 54A of the nozzle block 54 while being squeezed between the plate 54B and the sandwiching plate 56. The sandwiching plate 56 is also provided with through-holes 56*x*. The sandwiching plate 56 is disposed in a recessed region 54*b* in the main body 54A and is held in place with resilient pressure applied to the gasket 55 by the plate 54B, which is attached to the main body 54A. The main body 54A also has a cylindrical section 54*c* that extends from the backside of the main body 54A. The inside of the cylindrical section 54*c* is configured to house a plurality of capillary tubes 53, and the outside is formed with male threads 54*d*. Capillary tubes 53 are disposed inside the cylindrical section 54*c* of the main body 54A. The aft end of the cylindrical section 54*c* is connected to an aqueous alkaline solution supply socket 57.

The plurality of through-holes 54*x* established in the plate 54B of the nozzle block 54 in FIG. 10 are disposed in the pattern of a plurality of (concentric) rings. The capillary tubes 53 extend out from the nozzle block 54, the ends of the capillary tubes 53 act as static discharge protrusions 51, and openings inside the center of the capillary tubes 53 serve as fine-spray holes 52. The number of fine-spray holes 52 in a nozzle unit 50 is set by the number of capillary tubes 53 in the nozzle block 54. To increase the amount of mist sprayed by a nozzle unit 50 in a given time, the number of fine-spray holes 52 established in a single nozzle unit 50 is preferably greater than or equal to 10, more preferably greater than or equal to 20, and still more preferably greater than or equal to 30 holes. Since too many fine-spray holes 52 make nozzle unit 50 overall size large, less than or equal to 100 fine-spray holes 52 are established. In the nozzle unit 50 shown in FIG. 10, capillary tubes 53 in the center region of the nozzle block 54 protrude outward (downward in FIG. 10) more than capillary tubes 53 in the perimeter region, and a plane passing through the ends of the capillary tubes 53 has a downward pointing conical shape. However, the amount of nozzle unit capillary tube protrusion can also be uniform and the ends of all the capillary tubes can lie in a (flat) horizontal plane.

The nozzle unit 50 described above is provided with numerous thin-tube capillary tubes 53 and aqueous alkaline solution mist is sprayed from each capillary tube 53. However, the nozzle unit can also have a perforated plate (with multiple fine-spray hole openings) in place of the capillary tubes. The perforated plate is fabricated from (electrically) conducting material such as metal. The perforated plate can be sheet metal with fine-spray holes opened via laser pulse. The perforated plate can also sintered metal with fine-spray hole openings. An (electrically) conducting perforated plate can be connected to a high voltage power supply to apply high voltage between the perforated plate and the atomizing electrodes. However, the perforated plate does not necessarily need to be (electrically) conducting material. This is because the aqueous alkaline solution is (electrically) conducting and high voltage can be applied between the atomizing electrodes and aqueous alkaline solution sprayed from the spray holes to electro-statically atomize the sprayed mist. Accordingly, materials such as open-cell plastic foam with fine-spray holes can also be used as the perforated plate.

The spray case 47 is provided with atomizing electrodes 42 that are insulated with respect to the spray assembly 41. High potential is applied to the atomizing electrodes 42 with respect to the spray assembly 41. Accordingly, the atomizing electrodes 42 and spray assembly 41 are attached to the spray case 47 in a mutually insulated configuration. A static electricity atomizer 1B with the spray assembly fixed to the metal spray case without insulation has atomizing electrodes insulated from the spray case. Similarly, a static electricity atomizer 1B with the spray assembly insulated from the spray case has atomizing electrodes fixed to the spray case. However, both the spray assembly and the atomizing electrodes can be fixed to the spray case in an insulated manner.

Electric discharge takes place between atomizing electrodes 42 and static discharge protrusions 51 in the spray assembly 41, and this atomizes mist sprayed from the spray assembly 41 into fine particles. The atomizing electrodes 42 are positioned separated from, and in line with the spray direction of mist from the fine-spray holes 52. The atomizing electrodes 42 in FIGS. 9 and 10 are annular metal rings 42A positioned around nozzle block 54 perimeters, which is around the outside of the plurality of capillary tubes 53 attached to each nozzle block 54. As shown in FIG. 9, metal ring atomizing electrodes 42 are in the flow path of carrier gas (exhaust gas in the fourth embodiment) blown from flow inlets 64, and mist attachment to the atomizing electrodes 42 can be reduced by the carrier gas flow.

In addition, metal mesh can also be used as atomizing electrodes. Metal mesh atomizing electrodes are disposed separated from, and in line with the spray direction of mist from the static discharge protrusions 51. Metal mesh atomizing electrodes can make electric discharge from each static discharge protrusion 51 uniform to atomize mist sprayed from each fine-spray hole 52 into fine particles.

Atomizing electrodes 42 are disposed in front of each nozzle unit 50. Since the spray assembly 41 in the static electricity atomizer 1B of FIG. 9 sprays mist downward, atomizing electrodes 42 are disposed below the nozzle units 50.

The high voltage power supply 43 applies high voltage between the atomizing electrodes 42 and the nozzle units 50. The high voltage power supply 43 is a direct current (DC) power supply with the positive-side connected to the atomizing electrodes 42 and the negative-side connected to the nozzle units 50. However, the positive-side can also be connected to the nozzle units and the negative-side connected to the atomizing electrodes.

In the static electricity atomizer 1B in FIG. 9, the upper part of the spray case 47 is an enclosed chamber that serves as an air chamber 62. An air-tight partition wall 63 is fixed in the upper part of the spray case 47 to partition the air chamber 62. The partition wall 63 divides the interior of the spray case 47 into an air chamber 62 and a spray chamber 61 and also serves as the spray assembly 41 mounting piece that holds the plurality of nozzle units 50 in fixed positions. Spray assembly 41 nozzle units 50 are mounted on the partition wall 63 (mounting piece) with disposition that allows mist to be sprayed into the spray chamber 61. As shown in FIG. 10, nozzle units 50 are mounted on the partition wall 63 (in a manner that allows disconnection) via connecting bolts 58 that pass through connecting holes 54*e* opened through the flange region 54*a* of each nozzle block 54.

The air chamber 62 is an enclosed structure connected with a blower mechanism 67 that supplies air, and carrier gas (air) blown in from the blower mechanism 67 flows through flow inlets 64 opened through the partition wall 63 into the spray chamber 61. The flow inlets 64 are through-holes in the form of slits opened between the nozzle units 50 in a manner that blows carrier gas around each nozzle unit 50. However, the flow inlets are not necessarily slits. A plurality of circular or polygonal shaped through-holes can also be established between nozzle units as flow inlets that blow carrier gas between the nozzle units. Carrier gas blown into the spray chamber 61 from the flow inlets 64 transports the atomized mist. The spray case 47 in FIG. 9 has flow inlets 64 opened between adjacent nozzle units 50. Carrier gas blown from flow inlets 64 into the spray chamber 61 mixes with fine mist particles formed by atomization of spray from the nozzle units 50 by the atomizing electrodes 42, and this forms mist-and-gas mixture, which is supplied to the static mixer 6A.

As shown in FIG. 9, nozzle units 50 are mounted on the spray chamber 61 side of the partition wall 63 and spray mist into the spray chamber 61. The spray assembly 41 is connected to a pump 65 that supplies aqueous alkaline solution under pressure. The pump 65 pressurizes and delivers aqueous alkaline solution 9 retained in a solution tank 66 to the nozzle units 50. The pump 65 filters the aqueous alkaline solution and supplies it to the spray assembly 41. The filter is a filter that removes foreign matter that can clog the spray assembly 41. Making the pump 65 discharge pressure high increases the flow rate of aqueous alkaline solution sprayed from the nozzle units 50 and can reduce average particle diameter of the mist. However, average particle diameter of the mist is not only determined by the pressure of aqueous alkaline solution delivered from the pump 65, but also varies depending on nozzle unit 50 structure. Accordingly, the pressure of aqueous alkaline solution supplied from the pump 65 to the nozzle units 50 is set to an optimum value considering nozzle unit 50 structure and required mist particle diameter, and is set greater than or equal to 0.1 MPa, preferably greater than or equal to 0.2 MPa, and more preferably greater than or equal to 0.3 MPa. If the pressure of aqueous alkaline solution delivered by the pump 65 to the nozzle units 50 is made high, not only is an expensive pump required, but also the motor that drives the pump will have significant power consumption increasing operating cost. Consequently, the pressure of aqueous alkaline solution supplied from the pump 65 to the nozzle units 50 is set, for example, less than or equal to 1 MPa, preferably less than or equal to 0.8 MPa, and more preferably less than or equal to 0.7 MPa. Specifically, pressure of aqueous alkaline solution supplied from the pump 65 to the nozzle units 50 is set between 0.3 MPa and 0.6 MPa, and average particle diameter of the mist is made less than or equal to 50 μm, preferably less than or equal to 30 μm, and greater than or equal to 100 nm.

The method and apparatus for cleaning exhaust gas of the present invention can be applied advantageously as a method and apparatus that separates atmospheric pollutants from exhaust gas emitted from an industrial facility and/or equipment such as a power plant or blast furnace.

REFERENCE SIGNS LIST

100, 200, 300 cleaning apparatus
1 atomizer

1A ultrasonic atomizer
1B static electricity atomizer
2 separating unit
2A first separating unit
2B second separating unit
3 PM separator
5 controller
6 mixer
6A static mixer
6X first mixer
6Y second mixer
7 separator
8 oxidizing unit
9 aqueous alkaline solution
10 atomizing chamber
11 ultrasonic transducer
12 high frequency power supply
13 supply inlet
14 overflow outlet
15 solution supply system
16 solution tank
17 solution pump
18 bottom plate
18A opening
19 lead wire
20 blower mechanism
21 air heater
22 solution heater
24 supply fan
25 duct material
26 element blade
26A right element blade
26B left element blade
27 temperature sensor
28 temperature sensor
29 supply fan
30 electrostatic dust collector
31 discharge electrode
31A positive electrode
31B negative electrode
32 collector electrode
33 power supply
34 switch
35 air (gas) circulation path
41 spray assembly
42 atomizing electrode
42A annular metal ring
43 high voltage power supply
47 spray case
50 nozzle unit
51 static discharge protrusion
52 fine-spray hole
53 capillary tube
54 nozzle block
54A main body (of the nozzle block)
54B plate
54*a* flange region
54*b* recessed region
54*c* cylindrical section
54*d* male thread
54*e* connecting hole
54*x* through-hole
55 gasket
56 sandwiching plate
56*x* through-hole
57 aqueous alkaline solution supply socket
58 connecting bolt
61 spray chamber
62 air chamber
63 partition wall
64 flow inlet
65 pump
66 solution tank
67 blower mechanism
70 cyclone separator
71 cylinder region
72 tapered region
73 inlet duct
74 liquid outlet
75 exhaust duct
W liquid surface
P liquid column
H surface

What is claimed is:

1. A method for cleaning exhaust gas that separates atmospheric pollutants from exhaust gas, the method comprising:

an atomizing step that forms an aqueous alkaline solution mist with an atomizer;

a mixing step that mixes the aqueous alkaline solution mist with exhaust gas with a mixer to absorb atmospheric pollutants contained in the exhaust gas into the mist; and a separating step that separates the mist, which absorbed atmospheric pollutants in the mixing step, from the exhaust gas, wherein the atomizer ultrasonically vibrates the aqueous alkaline solution to form mist in the atomizing step, and wherein temperature in the mixer is maintained at or below a dew point.

2. The method for cleaning exhaust gas as cited in claim 1 wherein the atomizer ultrasonically vibrates the aqueous alkaline solution in the atomizing step to form a column of liquid that protrudes from the liquid surface, and blows exhaust gas over the surface of the liquid column to mix the mist and exhaust gas.

3. The method for cleaning exhaust gas as cited in claim 1 wherein the atomizer ultrasonically vibrates the aqueous alkaline solution in the atomizing step to form a column of liquid that protrudes from the liquid surface, blows a carrier gas over the surface of the liquid column to form a mist-and-gas mixture, and mixes that mist-gas mixture with exhaust gas in the mixing step.

4. The method for cleaning exhaust gas as cited in claim 1 wherein the mixing step comprises a first mixing step and a second mixing step; exhaust gas $SO_x$ is absorbed into the mist in the first mixing step, and subsequently exhaust gas $NO_x$ is absorbed into the mist in the second mixing step, further comprising an oxidizing step that supplies an oxygen containing gas to the exhaust gas, and oxidized $NO_2$ is absorbed into the mist.

5. The method for cleaning exhaust gas as cited in claim 1 wherein temperature or flow rate of exhaust gas supplied to the mixer is regulated to keep temperature in the mixer at or below the dew point.

6. The method for cleaning exhaust gas as cited in claim 1 wherein alkaline metal aqueous alkaline solution is used as the aqueous alkaline solution in the atomizing step.

7. The method for cleaning exhaust gas as cited in claim 1 further comprising a particulate matter separating step that removes fine particles from the exhaust gas, and atmospheric pollutants are separated from exhaust gas, which has particulate matter removed in the PM separating step.

* * * * *